US011206064B2

(12) United States Patent
Ren et al.

(10) Patent No.: US 11,206,064 B2
(45) Date of Patent: Dec. 21, 2021

(54) TRANSMISSION PRECODING MATRIX INDICATION METHOD AND DEVICE

(71) Applicant: HUAWEI TECHNOLOGIES CO., LTD., Guangdong (CN)

(72) Inventors: Haibao Ren, Shanghai (CN); Yi Huang, Shenzhen (CN); Yuanjie Li, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 24 days.

(21) Appl. No.: 16/673,432

(22) Filed: Nov. 4, 2019

(65) Prior Publication Data

US 2020/0099423 A1 Mar. 26, 2020

Related U.S. Application Data

(63) Continuation of application No. PCT/CN2018/085681, filed on May 4, 2018.

(30) Foreign Application Priority Data

May 5, 2017 (CN) .......................... 201710314190.8

(51) Int. Cl.
*H04B 7/0456* (2017.01)
*H04B 7/06* (2006.01)
*H04W 72/04* (2009.01)

(52) U.S. Cl.
CPC ......... *H04B 7/0456* (2013.01); *H04B 7/0639* (2013.01); *H04W 72/042* (2013.01); *H04W 72/0453* (2013.01)

(58) Field of Classification Search
CPC ... H04B 7/04–0495; H04B 7/06–0697; H04W 2/04–0493
See application file for complete search history.

(56) References Cited

U.S. PATENT DOCUMENTS

2009/0046569 A1* 2/2009 Chen ..................... H04L 5/0007
370/203
2013/0089078 A1 4/2013 Liu et al.
(Continued)

FOREIGN PATENT DOCUMENTS

CN 102291209 A 12/2011
CN 102468925 A 5/2012
(Continued)

OTHER PUBLICATIONS

Intel Corporation:"On Codebook Based UL Subband Precoding",3GPP DRAFT; R1-1702192, Feb. 12, 2017 (Feb. 12, 2017),XP051209350,total 4 pages.
(Continued)

*Primary Examiner* — Chi H Pham
*Assistant Examiner* — Vladislav Y Agureyev
(74) *Attorney, Agent, or Firm* — Womble Bond Dickinson (US) LLP

(57) ABSTRACT

This application provides a transmission precoding matrix indication method and a device. The method includes: determining a bit quantity of a transmission precoding matrix indicator field corresponding to a subband scheduled for uplink based on downlink control information received from a network device, where the bit quantity of the transmission precoding matrix indicator field corresponding to the subband is related to a quantity of subbands corresponding to the resource scheduled for uplink; and further, determining an uplink transmission precoding matrix corresponding to the subband based on the bit quantity of the transmission precoding matrix indicator field corresponding to the subband and the uplink transmission layer quantity. A transmission precoding matrix indicator field can be effectively used, and control channel resource utilization is improved.

22 Claims, 8 Drawing Sheets

(56) References Cited

U.S. PATENT DOCUMENTS

| | | | |
|---|---|---|---|
| 2014/0064393 A1* | 3/2014 | Sun | H04B 7/0478 375/267 |
| 2016/0227559 A1* | 8/2016 | Schober | H04L 5/006 |
| 2016/0338040 A1 | 11/2016 | Lee et al. | |
| 2018/0159707 A1* | 6/2018 | Onggosanusi | H04L 1/0026 |
| 2018/0167124 A1 | 6/2018 | Chen et al. | |
| 2018/0219603 A1 | 8/2018 | Park et al. | |
| 2018/0368083 A1* | 12/2018 | Yang | H04W 52/146 |
| 2019/0020396 A1* | 1/2019 | Wu | H04B 7/0626 |
| 2019/0074884 A1* | 3/2019 | Chen | H04B 7/0478 |
| 2019/0190669 A1* | 6/2019 | Park | H04W 72/0413 |

FOREIGN PATENT DOCUMENTS

| | | |
|---|---|---|
| CN | 106302269 A | 1/2017 |
| WO | 2010095884 A2 | 8/2010 |
| WO | 2017014612 A1 | 1/2017 |

OTHER PUBLICATIONS

Huawei et al.,"WF on UL MIMO transmission",3GPP TSG RAN WG1 NR Ad Hoc Meeting, R1-1701398, Spokane, USA, Jan. 16-20, 2017, total 3 pages.

Qualcomm Incorporated,"Codebook based UL transmission",3GPP TSG RAN WG1 #88,R1-1702599,Feb. 13-17, 2017, total 3 pages.

Nokia et al.,"Codebook Design for UL MIMO",3GPP TSG-RAN WG1 #88 ,R1-1703152,Athens, Greece, Feb. 13-17, 2017, total 2 pages.

LG Electronics et al.,"WF on control signaling for UL-MIMO",3GPP TSG RAN1 NR Ad-Hoc,R1-1703753,Athens, Greece, Feb. 13 17, 2017, total 4 pages.

Samsung et al.,"WF on UL Frequency Selective Precoding Support",3GPP TSG RAN WG1 88bis,R1-1706306, Spokane, USA, Apr. 3-7, 2017, total 3 pages.

Ericsson,"UL MIMO for NR",3GPP TSG-RAN WG1 #87, R1-1612320,Reno, USA, Nov. 14-18, 2016, total 3 pages.

* cited by examiner

TRANSMISSION PRECODING MATRIX INDICATION METHOD AND DEVICE

CROSS-REFERENCE TO RELATED APPLICATIONS

This application is a continuation of International Application No. PCT/CN2018/085681, filed on May 4, 2018, which claims priority to Chinese Patent Application No. 201710314190.8, filed on May 5, 2017, The disclosures of the aforementioned applications are hereby incorporated by reference in their entireties.

TECHNICAL FIELD

This application relates to communications technologies, and in particular, to a transmission precoding matrix indication method and a device.

BACKGROUND

Multiple-input multiple-output (MIMO) is one of key technologies in the new radio access technology (NR) and can further increase a system capacity by using a higher spatial degree of freedom. More antennas are disposed in a terminal device in NR than in a terminal device in long term evolution (LTE). The terminal device usually needs to preprocess, by using an uplink transmission precoding matrix, data that needs to be sent, to obtain a beamforming gain and reduce interference between different data streams of the same terminal device, so as to improve system performance. It can be learned that, how to indicate an uplink transmission precoding matrix is an important technology in NR.

After frequency selective scheduling is introduced in NR, how to indicate an uplink transmission precoding matrix is a problem that needs to be urgently resolved.

SUMMARY

This application provides a transmission precoding matrix indication method and a device, to provide a manner of indicating an uplink transmission precoding matrix adapted to an NR scenario, for example, indicating an uplink transmission precoding matrix in a frequency selective scheduling scenario, or indicating an uplink transmission precoding matrix that can reduce signaling overheads.

According to a first aspect, an embodiment of this application provides a transmission precoding matrix indication method, including: receiving downlink control information from a network device, where the downlink control information includes a resource allocation information indicator field, a transmission layer quantity indicator field, and a transmission precoding matrix indicator field corresponding to at least one subband, the resource allocation information indicator field is used to indicate a resource scheduled for uplink, the resource corresponds to the at least one subband, the transmission layer quantity indicator field is used to indicate an uplink transmission layer quantity, and the transmission precoding matrix indicator field corresponding to the subband is used to indicate an uplink transmission precoding matrix corresponding to the subband; determining a bit quantity of the transmission precoding matrix indicator field corresponding to the subband, where the bit quantity of the transmission precoding matrix indicator field corresponding to the subband is not greater than a preset total bit quantity of the transmission precoding matrix indicator field, a sum of bit quantities of all transmission precoding matrix indicator fields corresponding to all subbands is not greater than the preset total bit quantity, and the bit quantity of the transmission precoding matrix indicator field corresponding to the subband is related to a quantity of subbands corresponding to the resource scheduled for uplink; and determining the uplink transmission precoding matrix corresponding to the subband based on the bit quantity of the transmission precoding matrix indicator field corresponding to the subband and the uplink transmission layer quantity.

In one embodiment, the bit quantity of the transmission precoding matrix indicator field corresponding to the subband satisfies the following formula:

$N = \min\{\text{floor}(N_A/N_s), N_{max}\}$, where

N represents the bit quantity of the transmission precoding matrix indicator field corresponding to the subband, floor( ) represents a rounding down function, $N_A$ represents the preset total bit quantity of the transmission precoding matrix indicator field, $N_s$ represents a quantity of the at least one subband, $N_{max}$ represents a preset maximum bit quantity of the transmission precoding matrix indicator field, and the quantity of the at least one subband is a positive integer not less than 1.

In one embodiment, the bit quantity of the transmission precoding matrix indicator field corresponding to the subband is equal to a target preset bit quantity that is of the transmission precoding matrix indicator field, that corresponds to a quantity of the at least one subband, and that is in preset information, the preset information includes a correspondence between at least one preset subband quantity and a preset bit quantity that is of a transmission precoding matrix indicator field and that corresponds to the preset subband quantity, and the quantity of the at least one subband is a positive integer not less than 1.

In one embodiment, the transmission precoding matrix indicator field corresponding to the subband is used to indicate an initial index of the uplink transmission precoding matrix corresponding to the subband, and the determining the uplink transmission precoding matrix corresponding to the subband based on the bit quantity of the transmission precoding matrix indicator field corresponding to the subband and the uplink transmission layer quantity includes: determining the initial index of the uplink transmission precoding matrix corresponding to the subband based on the bit quantity of the transmission precoding matrix indicator field corresponding to the subband and a value of the transmission precoding matrix indicator field corresponding to the subband; determining a target index of the uplink transmission precoding matrix corresponding to the subband based on the initial index and a correspondence between an initial index and a target index; and determining the uplink transmission precoding matrix corresponding to the subband based on the target index, the uplink transmission layer quantity, and a codebook.

In one embodiment, the correspondence between an initial index and a target index satisfies the following formula or a table corresponding to the following formula:

$I_{dx} = I_{dx}^0 * k + \Delta$, where $I_{dx}^0$ represents the initial index, k represents an index adjustment coefficient, $\Delta$ represents an index offset coefficient, $I_{dx}$ represents the target index, k is a preset value or a value configured by the network device, and $\Delta$ is a preset value or a value configured by the network device.

In one embodiment, the transmission precoding matrix indicator field corresponding to the subband is used to indicate an index of the uplink transmission precoding matrix corresponding to the subband, and the determining the uplink transmission precoding matrix corresponding to the subband based on the bit quantity of the transmission precoding matrix indicator field corresponding to the subband and the uplink transmission layer quantity includes: determining, in a target codebook, the uplink transmission precoding matrix corresponding to the index indicated by the transmission precoding matrix indicator field corresponding to the subband, where the target codebook matches the bit quantity of the transmission precoding matrix indicator field corresponding to the subband and the uplink transmission layer quantity.

In one embodiment, if the first implementable manner of "determining the uplink transmission precoding matrix corresponding to the subband based on the bit quantity of the transmission precoding matrix indicator field corresponding to the subband and the uplink transmission layer quantity" is used, the uplink transmission precoding matrix corresponding to the subband may belong to the codebook in the foregoing part of this embodiment; or if the second implementable manner of "determining the uplink transmission precoding matrix corresponding to the subband based on the bit quantity of the transmission precoding matrix indicator field corresponding to the subband and the uplink transmission layer quantity" is used, the uplink transmission precoding matrix corresponding to the subband may belong to the target codebook in the foregoing part of this embodiment.

In one embodiment, the uplink transmission precoding matrix corresponding to the subband includes at least one non-zero element, and a modulus value of the non-zero element is different from a modulus value of another non-zero element in the uplink transmission precoding matrix. In other words, the uplink transmission precoding matrix corresponding to the subband is a non-constant modulus precoding matrix.

In one embodiment, a non-zero element whose modulus value is not 1 in the uplink transmission precoding matrix in the codebook or the target codebook is $\alpha_{m,n}e^{-j\varphi_{m,n}}$, where $\alpha_{m,n}$ represents an amplitude coefficient of an element in row m and column n in the uplink transmission precoding matrix, $0<\alpha_{m,n}|<1$, $\varphi_{m,n}$ represents a phase coefficient of the element in row m and column n in the uplink transmission precoding matrix, $0 \leq \varphi_{m,n} \leq 2\pi$, m is a positive integer less than or equal to an antenna port quantity, and is a positive integer less than or equal to the uplink transmission layer quantity. In one embodiment, $\alpha_{m,n}$ may alternatively be equal to 0 or 1 (in other words, a zero element or a one element in the codebook may alternatively be represented as $\alpha_{m,n}e^{-j\varphi_{m,n}}$.

In one embodiment, the uplink transmission layer quantity is equal to 1, the resource allocation information indicator field is used to indicate at least two subbands scheduled for uplink, a sum of squares of modulus values corresponding to all elements in row K of the uplink transmission precoding matrix corresponding to the at least two subbands is equal to a sum of squares of modulus values corresponding to all elements in row L of the uplink transmission precoding matrix corresponding to the at least two subbands, both K and L are positive integers less than or equal to an antenna port quantity, and K is not equal to L.

In one embodiment, the uplink transmission layer quantity is greater than 1, a sum of squares of modulus values corresponding to all elements in row K of the uplink transmission precoding matrix corresponding to the at least one subband is equal to a sum of squares of modulus values corresponding to all elements in row L of the uplink transmission precoding matrix corresponding to the at least one subband, both K and L are positive integers less than or equal to an antenna port quantity, and K is not equal to L.

In one embodiment, the method further includes: receiving coefficient indication information from the network device, and if the coefficient indication information is used to indicate $\alpha_{m,n}$ and/or $\varphi_{m,n}$ of an element $\alpha_{m,n}e^{-j\varphi_{m,n}}$ in the uplink transmission precoding matrix in the codebook, determining the codebook according to the coefficient indication information; or if the coefficient indication information is used to indicate $\alpha_{m,n}$ and/or $\varphi_{m,n}$ of an element $\alpha_{m,n}e^{-j\varphi_{m,n}}$ in the uplink transmission precoding matrix in the target codebook, determining the target codebook according to the coefficient indication information.

In one embodiment, the coefficient indication information includes M-bit first coefficient indication information and/or N-bit second coefficient indication information, where the first coefficient indication information is used to indicate $\alpha_{m,n}$, the second coefficient indication information is used to indicate $\varphi_{m,n}$, and both M and N are positive integers greater than 0.

According to a second aspect, an embodiment of this application provides a transmission precoding matrix indication method, including: determining a resource scheduled for uplink of a terminal device and a bit quantity of a transmission precoding matrix indicator field corresponding to at least one subband, where the resource corresponds to the at least one subband, the bit quantity of the transmission precoding matrix indicator field corresponding to the subband is not greater than a preset total bit quantity of the transmission precoding matrix indicator field, a sum of bit quantities of all transmission precoding matrix indicator fields corresponding to all subbands is not greater than the preset total bit quantity, and the bit quantity of the transmission precoding matrix indicator field corresponding to the subband is related to a quantity of subbands corresponding to the resource scheduled for uplink; and sending downlink control information to a terminal device, where the downlink control information includes a resource allocation information indicator field, a transmission layer quantity indicator field, and the transmission precoding matrix indicator field corresponding to the at least one subband, the resource allocation information indicator field is used to indicate the resource scheduled for uplink, the transmission layer quantity indicator field is used to indicate an uplink transmission layer quantity, and the transmission precoding matrix indicator field corresponding to the subband is used to indicate an uplink transmission precoding matrix corresponding to the subband.

In one embodiment, the bit quantity of the transmission precoding matrix indicator field corresponding to the subband satisfies the following formula:

$$N=\min\{\text{floor}(N_\Delta/N_s), N_{max}\}, \text{ where}$$

N represents the bit quantity of the transmission precoding matrix indicator field corresponding to the subband, floor( ) represents a rounding down function, $N_\Delta$ represents the preset total bit quantity of the transmission precoding matrix indicator field, $N_s$ represents a quantity of the at least one subband, $N_{max}$ represents a preset maximum bit quantity of the transmission precoding matrix indicator field, and the quantity of the at least one subband is a positive integer not less than 1.

In one embodiment, the bit quantity of the transmission precoding matrix indicator field corresponding to the subband is equal to a target preset bit quantity that is of the transmission precoding matrix indicator field, that corresponds to a quantity of the at least one subband, and that is in preset information, the preset information includes a correspondence between at least one preset subband quantity and a preset bit quantity that is of a transmission precoding matrix indicator field and that corresponds to the preset subband quantity, and the quantity of the at least one subband is a positive integer not less than 1.

In one embodiment, the transmission precoding matrix indicator field corresponding to the subband is used to indicate an initial index of the uplink transmission precoding matrix corresponding to the subband, and there is a correspondence between the initial index and a target index of a transmission precoding matrix corresponding to the subband; or the transmission precoding matrix indicator field corresponding to the subband is used to indicate an index of the uplink transmission precoding matrix corresponding to the subband, the index is used to indicate the uplink transmission precoding matrix that corresponds to the index indicated by the transmission precoding matrix indicator field corresponding to the subband and that is in a target codebook, and the target codebook matches the bit quantity of the transmission precoding matrix indicator field corresponding to the subband and the uplink transmission layer quantity.

In one embodiment, the uplink transmission precoding matrix corresponding to the subband may belong to the codebook or the target codebook.

In one embodiment, the uplink transmission precoding matrix corresponding to the subband includes at least one non-zero element, and a modulus value of the non-zero element is different from a modulus value of another non-zero element in the uplink transmission precoding matrix. In other words, the uplink transmission precoding matrix corresponding to the subband is a non-constant modulus precoding matrix.

In one embodiment, a non-zero element whose modulus value is not 1 in the uplink transmission precoding matrix in the codebook or the target codebook is $\alpha_{m,n}e^{-j\varphi_{m,n}}$, where $\alpha_{m,n}$ represents an amplitude coefficient of an element in row m and column n in the uplink transmission precoding matrix, $0<|\alpha_{m,n}|<1$, $\varphi_{m,n}$ represents a phase coefficient of the element in row m and column n in the uplink transmission precoding matrix, $0 \leq \varphi_{m,n} \leq 2\pi$, m is a positive integer less than or equal to an antenna port quantity, and n is a positive integer less than or equal to the uplink transmission layer quantity. In one embodiment, $\alpha_{m,n}$ may alternatively be equal to 0 or 1 (in other words, a zero element or a one element in the codebook may alternatively be represented as $\alpha_{m,n}e^{-j\varphi_{m,n}}$).

In one embodiment, the uplink transmission layer quantity is equal to 1, the resource allocation information indicator field is used to indicate at least two subbands scheduled for uplink, a sum of squares of modulus values corresponding to all elements in row K of the uplink transmission precoding matrix corresponding to the at least two subbands is equal to a sum of squares of modulus values corresponding to all elements in row L of the uplink transmission precoding matrix corresponding to the at least two subbands, both K and L are positive integers less than or equal to an antenna port quantity, and K is not equal to L.

In one embodiment, the uplink transmission layer quantity is greater than 1, a sum of squares of modulus values corresponding to all elements in row K of the uplink transmission precoding matrix corresponding to the at least one subband is equal to a sum of squares of modulus values corresponding to all elements in row L of the uplink transmission precoding matrix corresponding to the at least one subband, both K and L are positive integers less than or equal to an antenna port quantity, and K is not equal to L.

In one embodiment, coefficient indication information is sent to the terminal device, where the coefficient indication information is used to indicate $\alpha_{m,n}$ and/or $\varphi_{m,n}$ of an element $\alpha_{m,n}e^{-j\varphi_{m,n}}$ in the uplink transmission precoding matrix in the codebook or the target codebook. In one embodiment, $\alpha_{m,n}$ may alternatively be equal to 0 or 1.

In one embodiment, the coefficient indication information includes M-bit first coefficient indication information and/or N-bit second coefficient indication information, where the first coefficient indication information is used to indicate $\alpha_{m,n}$, the second coefficient indication information is used to indicate $\varphi_{m,n}$, and both M and N are positive integers greater than 0.

In the transmission precoding matrix indication methods provided in the first aspect and the second aspect, the network device determines the resource scheduled for uplink of the terminal device (where the resource corresponds to the at least one subband) and the bit quantity of the transmission precoding matrix indicator field corresponding to the at least one subband, and sends the downlink control information that includes the resource allocation information indicator field, the transmission layer quantity indicator field, and the transmission precoding matrix indicator field corresponding to the at least one subband to the terminal device. Further, the terminal device determines the at least one subband scheduled for uplink based on the resource allocation information indicator field, determines the bit quantity of the transmission precoding matrix indicator field corresponding to the subband (where the bit quantity of the transmission precoding matrix indicator field corresponding to the subband is related to the quantity of subbands corresponding to the resource scheduled for uplink), and determines the uplink transmission precoding matrix corresponding to the subband based on the bit quantity of the transmission precoding matrix indicator field corresponding to the subband and the uplink transmission layer quantity. It can be learned that, an uplink transmission precoding matrix is indicated in frequency selective scheduling, and a bit quantity of a transmission precoding matrix indicator field corresponding to a subband is flexibly adjusted based on a quantity of scheduled subbands, so that a transmission precoding matrix indicator field can be effectively used, and control channel resource utilization is improved.

Further, because the uplink transmission precoding matrix corresponding to the subband includes at least one non-zero element, and the modulus value of the non-zero element is different from the modulus value of the another non-zero element in the uplink transmission precoding matrix, in other words, the non-constant modulus precoding matrix is used, an actual channel can be favorably matched, so that precoding performance is improved.

According to a third aspect, an embodiment of this application provides a transmission precoding matrix indication method, including: receiving downlink control information from a network device, where the downlink control information includes a resource allocation information indicator field, a transmission layer quantity indicator field, and a transmission precoding matrix indicator field corresponding to at least one subband, the resource allocation information indicator field is used to indicate a resource scheduled for uplink, the resource corresponds to the at least one subband, the transmission layer quantity indicator field is used to indicate an uplink transmission layer quantity, and the transmission precoding matrix indicator field corresponding to the subband is used to indicate an uplink transmission precoding matrix corresponding to the subband; determining a bit quantity of the transmission precoding matrix indicator field corresponding to the subband, where the bit quantity of the transmission precoding matrix indicator field corresponding to the subband is not greater than a preset total bit quantity of the transmission precoding matrix indicator field, a sum of bit quantities of all transmission precoding matrix indicator fields corresponding to all subbands is not greater than the preset total bit quantity, and the bit quantity of the transmission precoding matrix indicator field corresponding to the subband is related to a quantity of subbands corresponding to the resource scheduled for uplink; and determining the uplink transmission precoding matrix corresponding to the subband based on the bit quantity of the transmission precoding matrix indicator field corresponding to the subband and the uplink transmission layer quantity.

In one embodiment, the bit quantity of the transmission precoding matrix indicator field corresponding to the subband satisfies the following formula:

$$N = \min\{\text{floor}(N_\Delta/N_s), N_{max}\}, \text{ where}$$

N represents the bit quantity of the transmission precoding matrix indicator field corresponding to the subband, floor( ) represents a rounding down function, $N_\Delta$ represents the preset total bit quantity of the transmission precoding matrix indicator field, $N_s$ represents a quantity of the at least one subband, $N_{max}$ represents a preset maximum bit quantity of the transmission precoding matrix indicator field, and the quantity of the at least one subband is a positive integer not less than 1.

In one embodiment, the bit quantity of the transmission precoding matrix indicator field corresponding to the subband is equal to a target preset bit quantity that is of the transmission precoding matrix indicator field, that corresponds to a quantity of the at least one subband, and that is in preset information, the preset information includes a correspondence between at least one preset subband quantity and a preset bit quantity that is of a transmission precoding matrix indicator field and that corresponds to the preset subband quantity, and the quantity of the at least one subband is a positive integer not less than 1.

In one embodiment, the transmission precoding matrix indicator field corresponding to the subband is used to indicate an initial index of the uplink transmission precoding matrix corresponding to the subband, and the determining the uplink transmission precoding matrix corresponding to the subband based on the bit quantity of the transmission precoding matrix indicator field corresponding to the subband and the uplink transmission layer quantity includes: determining the initial index of the uplink transmission precoding matrix corresponding to the subband based on the bit quantity of the transmission precoding matrix indicator field corresponding to the subband and a value of the transmission precoding matrix indicator field corresponding to the subband; determining a target index of the uplink transmission precoding matrix corresponding to the subband based on the initial index and a correspondence between an initial index and a target index; and determining the uplink transmission precoding matrix corresponding to the subband based on the target index, the uplink transmission layer quantity, and a codebook.

In one embodiment, the correspondence between an initial index and a target index satisfies the following formula or a table corresponding to the following formula:

$$I_{dx} = I_{dx}^0 * k + \Delta, \text{ where}$$

$I_{dx}^0$ represents the initial index, k represents an index adjustment coefficient, $\Delta$ represents an index offset coefficient, $I_{dx}$ represents the target index, k is a preset value or a value configured by the network device, and $\Delta$ is a preset value or a value configured by the network device.

In one embodiment, the transmission precoding matrix indicator field corresponding to the subband is used to indicate an index of the uplink transmission precoding matrix corresponding to the subband, and the determining the uplink transmission precoding matrix corresponding to the subband based on the bit quantity of the transmission precoding matrix indicator field corresponding to the subband and the uplink transmission layer quantity includes: determining, in a target codebook, the uplink transmission precoding matrix corresponding to the index indicated by the transmission precoding matrix indicator field corresponding to the subband, where the target codebook matches the bit quantity of the transmission precoding matrix indicator field corresponding to the subband and the uplink transmission layer quantity.

According to a fourth aspect, an embodiment of this application provides a transmission precoding matrix indication method, including: determining a resource scheduled for uplink of a terminal device and a bit quantity of a transmission precoding matrix indicator field corresponding to at least one subband, where the resource corresponds to the at least one subband, the bit quantity of the transmission precoding matrix indicator field corresponding to the subband is not greater than a preset total bit quantity of the transmission precoding matrix indicator field, a sum of bit quantities of all transmission precoding matrix indicator fields corresponding to all subbands is not greater than the preset total bit quantity, and the bit quantity of the transmission precoding matrix indicator field corresponding to the subband is related to a quantity of subbands corresponding to the resource scheduled for uplink; and sending downlink control information to a terminal device, where the downlink control information includes a resource allocation information indicator field, a transmission layer quantity indicator field, and the transmission precoding matrix indicator field corresponding to the at least one subband, the resource allocation information indicator field is used to indicate the resource scheduled for uplink, the transmission layer quantity indicator field is used to indicate an uplink transmission layer quantity, and the transmission precoding matrix indicator field corresponding to the subband is used to indicate an uplink transmission precoding matrix corresponding to the subband.

In one embodiment, the bit quantity of the transmission precoding matrix indicator field corresponding to the subband satisfies the following formula:

$$N = \min\{\text{floor}(N_\Delta/N_s), N_{max}\}, \text{ where}$$

N represents the bit quantity of the transmission precoding matrix indicator field corresponding to the subband, floor( ) represents a rounding down function, $N_\Delta$ represents the preset total bit quantity of the transmission precoding matrix indicator field, $N_s$ represents a quantity of the at least one subband, $N_{max}$ represents a preset maximum bit quantity of the transmission precoding matrix indicator field, and the quantity of the at least one subband is a positive integer not less than 1.

In one embodiment, the bit quantity of the transmission precoding matrix indicator field corresponding to the subband is equal to a target preset bit quantity that is of the transmission precoding matrix indicator field, that corresponds to a quantity of the at least one subband, and that is in preset information, the preset information includes a correspondence between at least one preset subband quantity and a preset bit quantity that is of a transmission precoding matrix indicator field and that corresponds to the preset subband quantity, and the quantity of the at least one subband is a positive integer not less than 1.

In one embodiment, the transmission precoding matrix indicator field corresponding to the subband is used to indicate an initial index of the uplink transmission precoding matrix corresponding to the subband, and there is a correspondence between the initial index and a target index of a transmission precoding matrix corresponding to the subband; or the transmission precoding matrix indicator field corresponding to the subband is used to indicate an index of the uplink transmission precoding matrix corresponding to the subband, the index is used to indicate the uplink transmission precoding matrix that corresponds to the index indicated by the transmission precoding matrix indicator field corresponding to the subband and that is in a target codebook, and the target codebook matches the bit quantity of the transmission precoding matrix indicator field corresponding to the subband and the uplink transmission layer quantity.

In the transmission precoding matrix indication methods provided in the third aspect and the fourth aspect, the network device determines the resource scheduled for uplink of the terminal device (where the resource corresponds to the at least one subband) and the bit quantity of the transmission precoding matrix indicator field corresponding to the at least one subband, and sends the downlink control information that includes the resource allocation information indicator field, the transmission layer quantity indicator field, and the transmission precoding matrix indicator field corresponding to the at least one subband to the terminal device. Further, the terminal device determines the at least one subband scheduled for uplink based on the resource allocation information indicator field, determines the bit quantity of the transmission precoding matrix indicator field corresponding to the subband (where the bit quantity of the transmission precoding matrix indicator field corresponding to the subband is related to the quantity of subbands corresponding to the resource scheduled for uplink), and determines the uplink transmission precoding matrix corresponding to the subband based on the bit quantity of the transmission precoding matrix indicator field corresponding to the subband and the uplink transmission layer quantity. It can be learned that, an uplink transmission precoding matrix is indicated in frequency selective scheduling, and a bit quantity of a transmission precoding matrix indicator field corresponding to a subband is flexibly adjusted based on a quantity of scheduled subbands, so that a transmission precoding matrix indicator field can be effectively used, and control channel resource utilization is improved.

According to a fifth aspect, an embodiment of this application provides a transmission precoding matrix indication method, including: receiving transmission precoding matrix indication information and transmission layer quantity indication information from a network device, where the transmission precoding matrix indication information is used to indicate at least one of uplink transmission precoding matrices included in a codebook, and the transmission layer quantity indication information is used to indicate a transmission layer quantity; and determining the at least one uplink transmission precoding matrix based on the transmission precoding matrix indication information, the transmission layer quantity indication information, and the codebook, where the uplink transmission precoding matrix includes at least one non-zero element, and a modulus value of the non-zero element is different from a modulus value of another non-zero element in the uplink transmission precoding matrix.

In one embodiment, the transmission layer quantity is equal to 1, and the transmission precoding matrix indication information is used to indicate at least two of the uplink transmission precoding matrices included in the codebook, where different uplink transmission precoding matrices correspond to different subbands, a sum of squares of modulus values corresponding to all elements in row K of the at least two uplink transmission precoding matrices is equal to a sum of squares of modulus values corresponding to all elements in row L of the at least two uplink transmission precoding matrices, both K and L are positive integers less than or equal to an antenna port quantity, and K is not equal to L.

In one embodiment, the transmission layer quantity is greater than 1, a sum of squares of modulus values corresponding to all elements in row K of the at least one uplink transmission precoding matrix is equal to a sum of squares of modulus values corresponding to all elements in row L of the at least one uplink transmission precoding matrix, both K and L are positive integers less than or equal to an antenna port quantity, and K is not equal to L.

In one embodiment, a non-zero element whose modulus value is not 1 in the uplink transmission precoding matrix in the codebook is $\alpha_{m,n}e^{-j\varphi_{m,n}}$, where $\alpha_{m,n}$ represents an amplitude coefficient of an element in row m and column n in the uplink transmission precoding matrix, $0<|\alpha_{m,n}|<1$, $\varphi_{m,n}$ represents a phase coefficient of the element in row m and column in the uplink transmission precoding matrix, $0 \leq \varphi_{m,n} \leq 2\pi$, m is a positive integer less than or equal to an antenna port quantity, and n is a positive integer less than or equal to the transmission layer quantity.

In one embodiment, the method further includes: receiving coefficient indication information from the network device, where the coefficient indication information is used to indicate $\alpha_{m,n}$ and/or $\varphi_{m,n}$ of an element $\alpha_{m,n}e^{-j\varphi_{m,n}}$ in the uplink transmission precoding matrix in the codebook.

In one embodiment, the coefficient indication information includes M-bit first coefficient indication information and/or N-bit second coefficient indication information, where the first coefficient indication information is used to indicate $\alpha_{m,n}$, the second coefficient indication information is used to indicate $\varphi_{m,n}$, and both M and N are positive integers greater than 0.

According to a sixth aspect, an embodiment of this application provides a transmission precoding matrix indication method, including: determining at least one uplink transmission precoding matrix and a transmission layer quantity that correspond to a terminal device, where the uplink transmission precoding matrix includes at least one non-zero element, and a modulus value of the non-zero element is different from a modulus value of another non-zero element in the uplink transmission precoding matrix; and sending transmission precoding matrix indication information and transmission layer quantity indication information to the terminal device, where the transmission precoding matrix indication information is used to indicate the at least one of uplink transmission precoding matrices included in a codebook, and the transmission layer quantity indication information is used to indicate the transmission layer quantity.

In one embodiment, the transmission layer quantity is equal to 1, and the determining at least one uplink transmission precoding matrix corresponding to a terminal device includes: determining at least two uplink transmission precoding matrices corresponding to the terminal device, where different uplink transmission precoding matrices correspond to different subbands, a sum of squares of modulus values corresponding to all elements in row K of the at least two uplink transmission precoding matrices is equal to a sum of squares of modulus values corresponding to all elements in row L of the at least two uplink transmission precoding matrices, both K and L are positive integers less than or equal to an antenna port quantity, and K is not equal to L.

In one embodiment, the transmission layer quantity is greater than 1, a sum of squares of modulus values corresponding to all elements in row K of the at least one uplink transmission precoding matrix is equal to a sum of squares of modulus values corresponding to all elements in row L of the at least one uplink transmission precoding matrix, both K and L are positive integers less than or equal to an antenna port quantity, and K is not equal to L.

In one embodiment, a non-zero element whose modulus value is not 1 in any one of the uplink transmission precoding matrices in the codebook is $\alpha_{m,n}e^{-j\varphi_{m,n}}$, where $\alpha_{m,n}$ represents an amplitude coefficient of an element in row m and column n in the uplink transmission precoding matrix, $0<|\alpha_{m,n}|<1$, $\varphi_{m,n}$ represents a phase coefficient of the element in row m and column n in the uplink transmission precoding matrix, $0\leq\varphi m,n\leq 2\pi$, m is a positive integer less than or equal to an antenna port quantity, and n is a positive integer less than or equal to the transmission layer quantity.

In one embodiment, the method further includes: sending coefficient indication information to the terminal device, where the coefficient indication information is used to indicate $\alpha_{m,n}$ and/or $\varphi_{m,n}$ of an element $\alpha_{m,n}e^{-j\varphi_{m,n}}$ in the uplink transmission precoding matrix in the codebook.

In one embodiment, the coefficient indication information includes M-bit first coefficient indication information and/or N-bit second coefficient indication information, where the first coefficient indication information is used to indicate $\alpha_{m,n}$, the second coefficient indication information is used to indicate $\varphi_{m,n}$, and both M and N are positive integers greater than 0.

In the transmission precoding matrix indication methods provided in the fifth aspect and the sixth aspect, the network device determines the at least one uplink transmission precoding matrix and the transmission layer quantity that correspond to the terminal device, and sends the transmission precoding matrix indication information (which is used to indicate the at least one of the uplink transmission precoding matrices included in the codebook) and the transmission layer quantity indication information (which is used to indicate the transmission layer quantity) to the terminal device. Further, the terminal device determines the at least one uplink transmission precoding matrix based on the transmission precoding matrix indication information, the transmission layer quantity indication information, and the codebook, where the uplink transmission precoding matrix includes the at least one non-zero element, and the modulus value of the non-zero element is different from the modulus value of the another non-zero element in the uplink transmission precoding matrix. It can be learned that, the uplink transmission precoding matrix is indicated. In addition, because a non-constant modulus precoding matrix is used, an actual channel can be favorably matched, so that precoding performance is improved.

According to a seventh aspect, an embodiment of this application provides a transmission precoding matrix indication method, including: receiving downlink control information from a network device, where the downlink control information includes a transmission precoding matrix indicator field and a transmission layer quantity indicator field, the transmission precoding matrix indicator field is used to indicate an index of at least one uplink transmission precoding matrix, and the transmission layer quantity indicator field is used to indicate an uplink transmission layer quantity; and determining the uplink transmission precoding matrix based on the index of the at least one uplink transmission precoding matrix, the uplink transmission layer quantity, and a codebook subset, where the codebook subset is a part of a codebook corresponding to the uplink transmission layer quantity.

In one embodiment, indexes of uplink transmission precoding matrices in the codebook subset are indexes successively re-established in a sequential order of the uplink transmission precoding matrices in the codebook.

In one embodiment, the method further includes: receiving a configuration message sent by the network device, where the configuration message is used to indicate the codebook subset, and the configuration message may be a higher layer signaling message or a physical layer signaling message.

In one embodiment, the configuration message includes at least one bit, the bit is used to indicate whether at least one transmission precoding matrix corresponding to the bit in the codebook belongs to the codebook subset, and if a value of the bit is equal to a preset value, the at least one transmission precoding matrix corresponding to the bit in the codebook belongs to the codebook subset.

In one embodiment, the configuration message includes a sampling factor l and an offset $\Lambda$, a transmission precoding matrix whose index $I_{dx}^*$ satisfies a formula $(I_{dx}^*-\Lambda)$ mod $l=0$ in the codebook belongs to the codebook subset, $I_{dx}^*$ represents the index of the transmission precoding matrix in the codebook, and mod represents a REM operation.

According to an eighth aspect, an embodiment of this application provides a transmission precoding matrix indication method, including: determining at least one uplink transmission precoding matrix and an uplink transmission layer quantity that correspond to a terminal device; and sending downlink control information to the terminal device, where the downlink control information includes a transmission precoding matrix indicator field and a transmission layer quantity indicator field, the transmission precoding matrix indicator field is used to indicate an index of the at least one uplink transmission precoding matrix, the transmission layer quantity indicator field is used to indicate the uplink transmission layer quantity, a bit quantity of the transmission precoding matrix indicator field is related to a quantity of precoding matrices included in a codebook subset, and the codebook subset is a part of a codebook corresponding to the uplink transmission layer quantity.

In one embodiment, the method further includes: determining the codebook subset corresponding to the terminal device; and sending a configuration message to the terminal device, where the configuration message is used to indicate the codebook subset, and the configuration message may be a higher layer signaling message or a physical layer signaling message.

In one embodiment, indexes of uplink transmission precoding matrices in the codebook subset are indexes successively re-established in a sequential order of the uplink transmission precoding matrices in the codebook.

In one embodiment, the configuration message includes at least one bit, the bit is used to indicate whether at least one transmission precoding matrix corresponding to the bit in the codebook belongs to the codebook subset, and if a value of the bit is equal to a preset value, the at least one transmission precoding matrix corresponding to the bit in the codebook belongs to the codebook subset.

In one embodiment, the configuration message includes a sampling factor l and an offset Λ, a transmission precoding matrix whose index $I_{dx}^*$ satisfies a formula $(I_{dx}^*-\Lambda)$ mod l=0 in the codebook belongs to the codebook subset, $I_{dx}^*$ represents the index of the transmission precoding matrix in the codebook, and mod represents a REM operation.

In the transmission precoding matrix indication methods provided in the seventh aspect and the eighth aspect, the network device determines the at least one uplink transmission precoding matrix and the uplink transmission layer quantity that correspond to the terminal device, and sends the downlink control information to the terminal device, where the downlink control information includes the transmission precoding matrix indicator field and the transmission layer quantity indicator field, the transmission precoding matrix indicator field is used to indicate the index of the at least one uplink transmission precoding matrix, the transmission layer quantity indicator field is used to indicate the uplink transmission layer quantity, the bit quantity of the transmission precoding matrix indicator field is related to the quantity of precoding matrices included in the codebook subset, and the codebook subset is a part of the codebook corresponding to the uplink transmission layer quantity. Further, the terminal device determines the uplink transmission precoding matrix based on the index of the at least one uplink transmission precoding matrix, the transmission layer quantity, and the codebook subset. It can be learned that, the uplink transmission precoding matrix is indicated. In addition, because the codebook subset is a part of the codebook corresponding to the uplink transmission layer quantity, the bit quantity of the transmission precoding matrix indicator field is less than a bit quantity that is used to indicate a transmission precoding matrix indicator field of the codebook, so that overheads of the transmission precoding matrix indicator field are reduced.

According to a ninth aspect, an embodiment of this application provides a device, including a processor and a memory, where the memory is configured to store an instruction, the processor is configured to execute the instruction stored in the memory, and when the processor executes the instruction stored in the memory, the device is configured to complete any method according to any one of the first aspect, the third aspect, the fifth aspect, and the seventh aspect.

In one embodiment, the device may further include an input/output port.

In one embodiment, the device may be a terminal device, or a chip that can be disposed in a terminal device.

According to a tenth aspect, an embodiment of this application provides a device, including a processor and a memory, where the memory is configured to store an instruction, the processor is configured to execute the instruction stored in the memory, and when the processor executes the instruction stored in the memory, the device is configured to complete any method according to any one of the second aspect, the fourth aspect, the sixth aspect, and the eighth aspect.

In one embodiment, the device may further include an input/output port.

In one embodiment, the device may be a network device, or a chip that can be disposed in a network device.

According to an eleventh aspect, an embodiment of this application provides an apparatus for a transmission precoding matrix. The apparatus includes some modules, configured to implement any method related to the foregoing terminal device. Specific modules may correspond to the method operations, and details are not described herein again.

According to a twelfth aspect, an embodiment of this application provides an apparatus for a transmission precoding matrix. The apparatus includes some modules, configured to implement any method related to the foregoing network device. Specific modules may correspond to the method operations, and details are not described herein again.

According to a thirteenth aspect, a computer storage medium is further provided, configured to store some instructions, and when these instructions are executed, any method related to the foregoing terminal device or network device may be completed.

According to a fourteenth aspect, a communications system is further provided, including the terminal device and the network device that are provided in the foregoing descriptions.

Compared with the prior art, according to the transmission precoding matrix indication method and the device provided in this application, the network device determines the resource scheduled for uplink of the terminal device (where the resource corresponds to the at least one subband) and the bit quantity of the transmission precoding matrix indicator field corresponding to the at least one subband, and sends the downlink control information that includes the resource allocation information indicator field, the transmission layer quantity indicator field, and the transmission precoding matrix indicator field corresponding to the at least one subband to the terminal device. Further, the terminal device determines the at least one subband scheduled for uplink based on the resource allocation information indicator field, determines the bit quantity of the transmission precoding matrix indicator field corresponding to the subband (where the bit quantity of the transmission precoding matrix indicator field corresponding to the subband is related to the quantity of subbands corresponding to the resource scheduled for uplink), and determines the uplink transmission precoding matrix corresponding to the subband based on the bit quantity of the transmission precoding matrix indicator field corresponding to the subband and the uplink transmission layer quantity. It can be learned that, an uplink transmission precoding matrix is indicated in frequency selective scheduling, and a bit quantity of a transmission precoding matrix indicator field corresponding to a subband is flexibly adjusted based on a quantity of scheduled subbands, so that a transmission precoding matrix indicator field can be effectively used, and control channel resource utilization is improved.

In one embodiment, the subband in the embodiments of this application refers to a predefined or configured physical radio resource block group (Precoding Resource block Group, PRG) that is precoded by using a same precoding matrix. In other words, all physical resource blocks (Physical resource block) in a subband that are used by the terminal device to transmit data are precoded by using a same uplink transmission precoding matrix.

In one embodiment, the codebook, the target codebook, the codebook subset, or the like in the embodiments of this application includes at least one precoding matrix (or referred to as a transmission precoding matrix, an uplink transmission precoding matrix, or the like).

DESCRIPTION OF EMBODIMENTS

Figure 1:
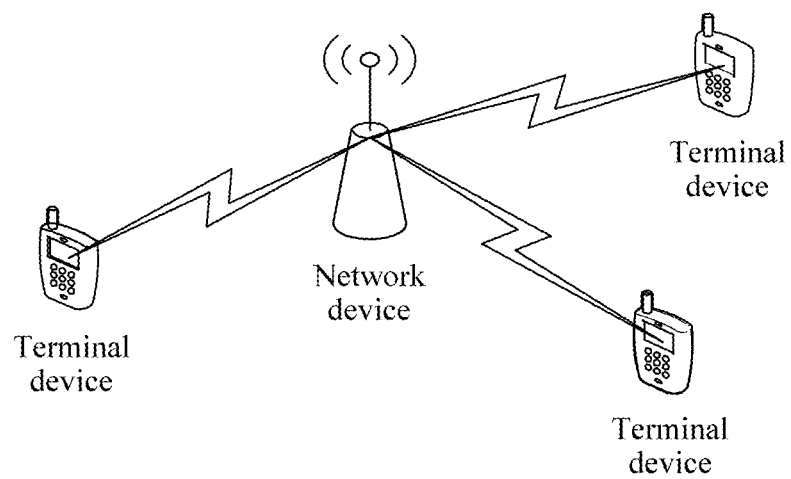
FIG. 1 is a diagram of a system network architecture according to this application.

A transmission precoding matrix indication method and a device that are provided in this application are applicable to a system architecture shown in FIG. 1. As shown in FIG. 1, the system architecture includes a network device and at least one terminal device. For the system architecture shown in FIG. 1, the transmission precoding matrix indication method provided in this application is applicable to an application scenario in which a terminal device performs uplink precoding transmission in NR, or certainly, is also applicable to another application scenario. This is not limited in the embodiments of this application.

Usually, transmission precoding matrix indicator (TPMI) information required by the terminal device to perform uplink transmission precoding may be obtained by using downlink control information (DCI) of the network device, or may be obtained by using uplink and downlink channel reciprocity, so that the terminal device can perform uplink data transmission based on an uplink transmission precoding matrix indicated by the TPMI information. A value corresponding to the TPMI information is equal to a precoding matrix index in a codebook.

Usually, for each rank (which is equal to a transmission layer quantity), a particular quantity of precoding matrices are designed in a system to represent a quantized channel or a direction vector corresponding to a channel, and these designed precoding matrices form the codebook. Each precoding matrix in the codebook corresponds to a precoding matrix index. Usually, there is a correspondence between a precoding matrix index and a corresponding TPMI. It should be noted that, the precoding matrix index may be independently indicated by one TPMI or jointly indicated by a plurality of TPMIs. It should be noted that, the codebook may be predefined, and both the network device and the terminal device may store a corresponding codebook, and have a consistent understanding of a correspondence between each precoding matrix, each precoding matrix index, and each TPMI in the codebook. After the network device selects a precoding matrix from the defined codebook based on an estimated uplink channel, and determines a precoding matrix index of the precoding matrix, the network device only needs to inform the terminal device of the precoding matrix index (or the TPMI) corresponding to the selected precoding matrix by using downlink signaling (such as physical layer signaling DCI). The terminal device can determine the specific precoding matrix based on the signaling delivered by the network device.

The network device shown in FIG. 1 may be a device that is in an access network and that communicates with a wireless terminal by using at least one sector on an air interface. In one embodiment, the network device may be configured to perform conversion between a received over-the-air frame and an internet protocol (Internet Protocol, IP) packet, and function as a router between the wireless terminal and the remaining part of the access network. The remaining part of the access network may include an (IP) network. In one embodiment, the network device may further coordinate attribute management of the air interface. In one embodiment, the network device may be a base station, and the base station may be a NodeB in WCDMA, or may be an evolved NodeB (eNodeB, eNB, e-NodeB, or evolved Node B) in LTE, or may be a transmission reception point (TRP), a gNB, or a transmission point (TP) in NR. This is not limited in this application.

The terminal device shown in FIG. 1 may be user equipment (UE), which is a device that provides voice and/or data connectivity for a user, for example, a handheld device having a wireless connection function or an in-vehicle device. In one embodiment, the terminal device may be a handheld device having a wireless connection function or another processing device connected to a wireless modem. In addition, the terminal device may communicate with one or more core networks through a radio access network (RAN). For example, the terminal device may be specifically a mobile terminal, such as a mobile phone (or referred to as a "cellular" phone), and a computer having a mobile terminal. The computer having a mobile terminal may be a portable, pocket-sized, handheld, computer-built in, or in-vehicle mobile apparatus. These mobile apparatuses may exchange voice and/or data with the core network.

It may be understood that, "at least one" appearing in the embodiments of this application means "one" or "more".

In addition, this application is applicable not only to NR but also to a wireless communications system such as a universal mobile telecommunications system (UMTS) system, a CDMA system, a wireless local area network (WLAN), or an LTE system.

After frequency selective scheduling is introduced in NR, a downlink control channel size is usually fixed (in other words, a transmission precoding matrix indicator field is fixed) in the prior art. Consequently, a transmission precoding matrix indicator field corresponding to an unscheduled subband probably cannot be effectively used, resulting in a waste of control channel resources. Therefore, Embodiment 1 of the transmission precoding matrix indication method provided in this application is to resolve the technical problem of a waste of control channel resources in the prior art.

Technical solutions of this application and how to resolve the foregoing technical problem by using the technical solutions of this application are described in detail below by using specific embodiments. The following several specific embodiments may be combined with each other, and a same or similar concept or process may not be described repeatedly in some embodiments.

Figure 2A:
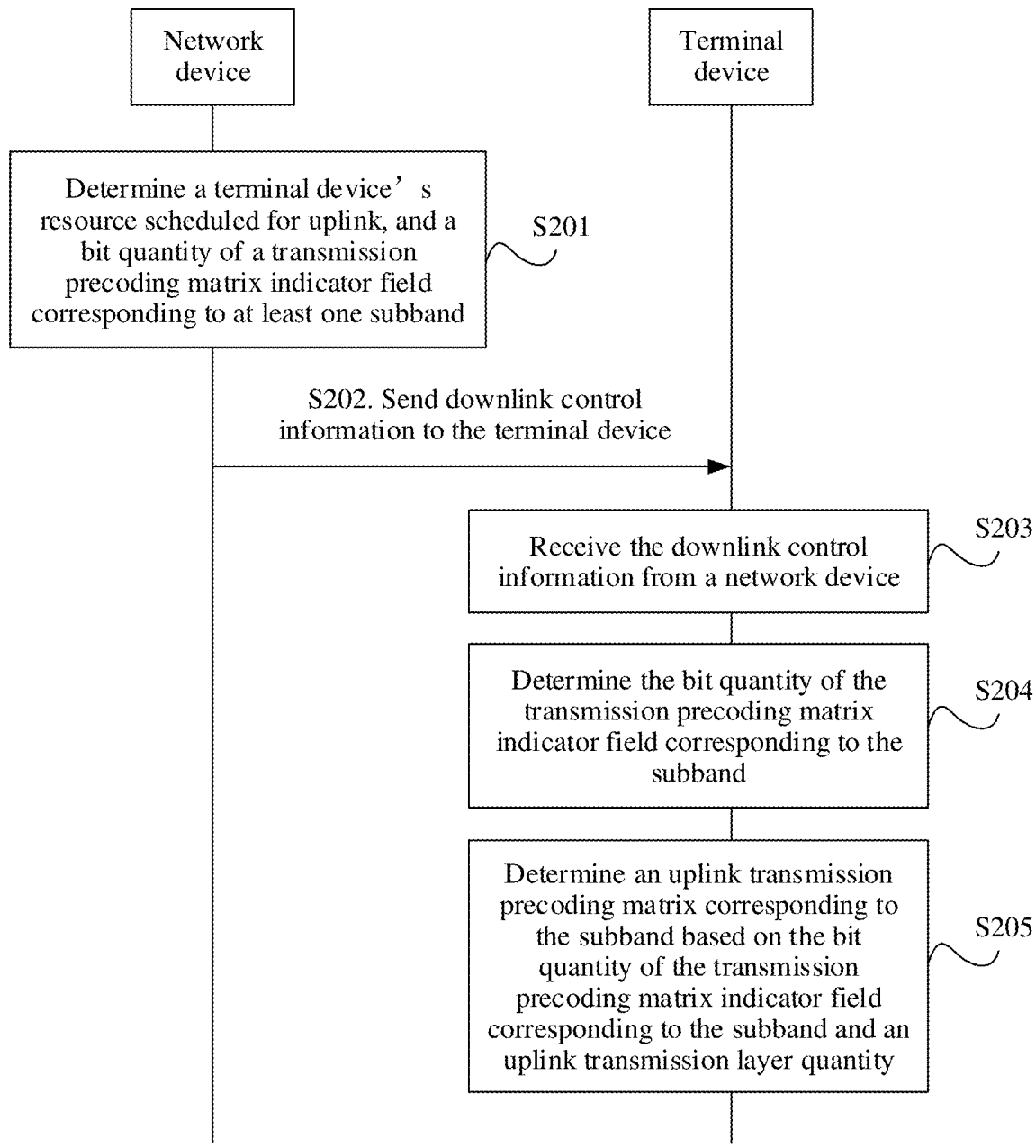
FIG. 2A is a schematic flowchart of Embodiment 1 of a transmission precoding matrix indication method according to this application.

FIG. 2A is a schematic flowchart of Embodiment 1 of a transmission precoding matrix indication method according to this application. Execution bodies in this embodiment include a terminal device and/or a network device. Both the terminal device and the network device may be implemented by using software and/or hardware. As shown in FIG. 2A, the method in this embodiment includes the following operations.

Operation S201. Determine the terminal device's resource scheduled for uplink and a bit quantity of a transmission precoding matrix indicator field corresponding to at least one subband.

In this operation, the network device determines the resource scheduled for uplink of the terminal device based on uplink channel state information of the terminal device and an uplink load status in a current network. In one embodiment, if the resource is a PRB, the network device determines, based on a correspondence between a PRB and a subband, at least one subband corresponding to the PRB scheduled for uplink. Alternatively, if the resource is a subband, the network device directly determines at least one subband scheduled for uplink of the terminal device. Further, the network device determines the bit quantity of the transmission precoding matrix indicator field corresponding to the at least one subband based on a quantity of the at least one subband. A bit quantity of a transmission precoding matrix indicator field corresponding to a subband is not greater than a preset total bit quantity of the transmission precoding matrix indicator field. A sum of bit quantities of all transmission precoding matrix indicator fields corresponding to all subbands is not greater than the preset total bit quantity. The bit quantity of the transmission precoding matrix indicator field corresponding to a subband is related to a quantity of subbands corresponding to the resource scheduled for uplink. In this way, the bit quantity of the transmission precoding matrix indicator field corresponding to the subband is flexibly adjusted based on a quantity of scheduled subbands. In one embodiment, both the network device and the terminal device learn of the preset total bit quantity of the transmission precoding matrix indicator field in advance. Certainly, the network device may alternatively determine the resource scheduled for uplink of the terminal device based on other information. This is not limited in this embodiment.

In one embodiment, the subband in this embodiment of this application refers to a predefined or configured physical radio resource block group (PRG) that is precoded by using a same precoding matrix. In other words, all physical resource blocks in a subband that are used by the terminal device to transmit data are precoded by using a same uplink transmission precoding matrix. For example, the subband may be a plurality of consecutive PRBs. These consecutive PRBs are precoded by using a same precoding matrix, so that it is ensured that channel estimation can be more accurately performed on a receive side. It should be noted that, in this application, a unit scheduled for uplink by the network device may be a PRB, or a set corresponding to a plurality of PRBs based on a preset relationship. This is not limited in this application. In one embodiment, the subband in this application is a subband that is determined by the network device based on a relationship between a PRB and a subband and to which the PRB scheduled for uplink belongs. The relationship between a PRB and a subband is not limited in this application. For example, two PRBs are scheduled, respectively corresponding to a PRB 1 and a PRB 10. If the subband is defined as five consecutive PRBs, and a smallest PRB index of the five consecutive PRBs can be exactly divided by 5, the two PRBs respectively belong to two subbands. An independent TPMI field needs to be used to indicate a transmission precoding matrix.

In one embodiment, there are at least the following implementable manners in which the bit quantity of the transmission precoding matrix indicator field corresponding to a subband is related to the quantity of subbands scheduled for uplink:

A first implementable manner: The bit quantity of the transmission precoding matrix indicator field corresponding to a subband satisfies the following formula:

$N=\min\{floor(N_A/N_s),N_{max}\}$, where

N represents the bit quantity of the transmission precoding matrix indicator field corresponding to the subband, floor( ) represents a rounding down function, $N_A$ represents the preset total bit quantity of the transmission precoding matrix indicator field, $N_s$ represents a quantity of the at least one subband, $N_{max}$ represents a preset maximum bit quantity of the transmission precoding matrix indicator field, and the quantity of the at least one subband is a positive integer not less than 1.

In this implementable manner, the network device determines the bit quantity of the transmission precoding matrix indicator field corresponding to the subband based on the formula $N=\min\{floor(N_A/N_s),N_{max}\}$, and certainly, may alternatively determine N based on another equivalent or variant formula of the formula $N=\min\{floor(N_A/N_s),N_{max}\}$. This is not limited in this embodiment. For example, it is assumed that a bandwidth is 20 M, 10 subbands are included, the preset total bit quantity $N_A$ of the transmission precoding matrix indicator field is 20 bits, and the preset maximum bit quantity $N_{max}$ of the transmission precoding matrix indicator field is 6 bits. When the quantity $N_s$ of scheduled subbands is 10, the network device determines, based on the formula $N=\min\{floor(N_A/N_s),N_{max}\}$, that the bit quantity N of the transmission precoding matrix indicator field corresponding to each subband is 2; or when the quantity $N_s$ of scheduled subbands is 5, the network device determines, based on the formula $N=\min\{floor(N_A/N_s),N_{max}\}$, that the bit quantity N of the transmission precoding matrix indicator field corresponding to each subband is 4.

In a second implementable manner, the bit quantity of the transmission precoding matrix indicator field corresponding to the subband is equal to a target preset bit quantity that is of the transmission precoding matrix indicator field, that corresponds to a quantity of the at least one subband, and that is in preset information, where the preset information includes a correspondence between at least one preset subband quantity and a preset bit quantity that is of a transmission precoding matrix indicator field and that corresponds to the preset subband quantity, and the quantity of the at least one subband is a positive integer not less than 1.

In this implementable manner, the network device determines the bit quantity of the transmission precoding matrix indicator field corresponding to the subband based on the quantity of the at least one subband and the preset information, where the bit quantity of the transmission precoding matrix indicator field corresponding to the subband is equal to the target preset bit quantity that is of the transmission precoding matrix indicator field, that corresponds to the at least one subband, and that is in the preset information. In one embodiment, the preset information is preset in both the network device and the terminal device. Alternatively, the preset information in the terminal device may be configured by the network device for the terminal device by using a higher layer signaling message, where the higher layer signaling message may be a radio resource control (Radio Resource Control, RRC) message, a media access control control element (Media Access Control Control Element, MAC CE), or the like. In one embodiment, the preset information may be stored in the network device and the terminal device in a form of a table (where Table 1 is a table of the preset information, where $B_1<B_2<\ldots<B_M$, and $n_1 \geq n_2 \geq \ldots \geq n_M$), and certainly, may alternatively be stored in another format. This is not limited in this embodiment.

TABLE 1

Table of preset information

| Quantity of subbands | Bit quantity of a transmission precoding matrix indicator field corresponding to a subband |
|---|---|
| 1 to $B_1$ | $n_1$ |
| $B_1 + 1$ to $B_2$ | $n_2$ |
| ... | ... |
| $B_{M-1} + 1$ to $B_M$ | $n_M$ |

Certainly, there may be another implementable manner in which the bit quantity of the transmission precoding matrix indicator field corresponding to a subband is related to the quantity of subbands scheduled for uplink. This is not limited in this embodiment of this application.

Operation S202. Send downlink control information to the terminal device.

In this operation, the network device sends the downlink control information to the terminal device. The downlink control information includes a resource allocation information indicator field, a transmission layer quantity indicator field, and the transmission precoding matrix indicator field corresponding to the at least one subband. The resource allocation information indicator field is used to indicate the resource scheduled for uplink. The transmission layer quantity indicator field is used to indicate an uplink transmission layer quantity that corresponds to the terminal device and that is determined by the network device. The transmission precoding matrix indicator field corresponding to a subband is used to indicate an uplink transmission precoding matrix that corresponds to the subband and that is determined by the network device. In one embodiment, for a manner in which the network device determines the uplink transmission layer quantity and the at least one uplink transmission precoding matrix that correspond to the terminal device, refer to a determining manner in the prior art. This is not limited in this embodiment of this application. Certainly, the downlink control information may alternatively include another indicator field. This is not limited in this embodiment.

In one embodiment, the transmission precoding matrix indicator field corresponding to the subband is used to indicate an initial index of the uplink transmission precoding matrix corresponding to the subband, and there is a correspondence between the initial index and a target index of a transmission precoding matrix corresponding to the subband. Alternatively, the transmission precoding matrix indicator field corresponding to the subband is used to indicate an index of the uplink transmission precoding matrix corresponding to the subband, the index is used to indicate the uplink transmission precoding matrix that corresponds to the index indicated by the transmission precoding matrix indicator field corresponding to the subband and that is in a target codebook, and the target codebook matches the bit quantity of the transmission precoding matrix indicator field corresponding to the subband and the uplink transmission layer quantity.

It should be noted that, when joint encoding is performed, the transmission layer quantity indicator field and the transmission precoding matrix indicator field corresponding to the at least one subband may be combined into one field in the downlink control information. This is not limited in this embodiment of this application.

Operation S203. Receive the downlink control information from the network device.

In this operation, the terminal device receives the downlink control information from the network device. The downlink control information includes the resource allocation information indicator field, the transmission layer quantity indicator field, and the transmission precoding matrix indicator field corresponding to the at least one subband. The resource allocation information indicator field is used to indicate the resource scheduled for uplink. The resource corresponds to the at least one subband. The transmission layer quantity indicator field is used to indicate the uplink transmission layer quantity. The transmission precoding matrix indicator field corresponding to a subband is used to indicate the uplink transmission precoding matrix corresponding to the subband.

In one embodiment, the terminal device determines the transmission precoding matrix indicator field corresponding to each subband based on a preset correspondence between a subband and a transmission precoding matrix indicator field. Certainly, the terminal device may alternatively determine the transmission precoding matrix indicator field corresponding to each subband in another manner. This is not limited in this embodiment of this application.

Operation S204. Determine the bit quantity of the transmission precoding matrix indicator field corresponding to the subband.

In this operation, if the resource scheduled for uplink that is indicated by using the resource allocation information indicator field is a PRB, the terminal device determines, based on a correspondence between a PRB and a subband, at least one subband corresponding to the PRB scheduled for uplink; or if the resource scheduled for uplink that is indicated by using the resource allocation information indicator field is a subband, the terminal device directly determines at least one subband scheduled for uplink. Certainly, if the resource scheduled for uplink that is indicated by using the resource allocation information indicator field is other information, the terminal device may determine at least one subband scheduled for uplink in another manner. This is not limited in this embodiment.

Further, the terminal device determines the bit quantity of the transmission precoding matrix indicator field corresponding to the at least one subband based on the quantity of the at least one subband scheduled for uplink, where the bit quantity of the transmission precoding matrix indicator field corresponding to a subband is not greater than the preset total bit quantity of the transmission precoding matrix indicator field, the sum of the bit quantities of all the transmission precoding matrix indicator fields corresponding to all subbands is not greater than the preset total bit quantity, and the bit quantity of the transmission precoding matrix indicator field corresponding to a subband is related to the quantity of subbands corresponding to the resource scheduled for uplink.

In one embodiment, there are at least the following implementable manners in which the bit quantity of the transmission precoding matrix indicator field corresponding to a subband is related to the quantity of subbands scheduled for uplink:

A first implementable manner: The bit quantity of the transmission precoding matrix indicator field corresponding to a subband satisfies the following formula:

$$N = \min\{\text{floor}(N_A/N_s), N_{max}\}, \text{ where}$$

N represents the bit quantity of the transmission precoding matrix indicator field corresponding to the subband, floor ( ) represents a rounding down function, $N_\Delta$ represents the preset total bit quantity of the transmission precoding matrix indicator field, $N_s$ represents a quantity of the at least one subband, $N_{max}$ represents a preset maximum bit quantity of the transmission precoding matrix indicator field, and the quantity of the at least one subband is a positive integer not less than 1.

In this implementable manner, the terminal device determines the bit quantity of the transmission precoding matrix indicator field corresponding to the subband based on the formula $N=\min\{\text{floor }(N_\Delta/N_s), N_{max}\}$, and certainly, may alternatively determine N based on another equivalent or variant formula of the formula $N=\min\{\text{floor}(N_\Delta/N_s), N_{max}\}$. This is not limited in this embodiment.

In a second implementable manner, the bit quantity of the transmission precoding matrix indicator field corresponding to the subband is equal to a target preset bit quantity that is of the transmission precoding matrix indicator field, that corresponds to a quantity of the at least one subband, and that is in preset information, the preset information includes a correspondence between at least one preset subband quantity and a preset bit quantity that is of a transmission precoding matrix indicator field and that corresponds to the preset subband quantity, and the quantity of the at least one subband is a positive integer not less than 1.

In this implementable manner, the terminal device determines the bit quantity of the transmission precoding matrix indicator field corresponding to the subband based on the quantity of the at least one subband and the preset information, where the bit quantity of the transmission precoding matrix indicator field corresponding to the subband is equal to the target preset bit quantity that is of the transmission precoding matrix indicator field, that corresponds to the at least one subband, and that is in the preset information.

Certainly, there may be another implementable manner in which the bit quantity of the transmission precoding matrix indicator field corresponding to a subband is related to the quantity of subbands scheduled for uplink. This is not limited in this embodiment of this application.

Operation S205. Determine the uplink transmission precoding matrix corresponding to the subband based on the bit quantity of the transmission precoding matrix indicator field corresponding to the subband and the uplink transmission layer quantity.

In this operation, the terminal device determines the uplink transmission precoding matrix corresponding to the subband based on the bit quantity of the transmission precoding matrix indicator field corresponding to the subband and the uplink transmission layer quantity, to further preprocess, based on the uplink transmission precoding matrix corresponding to the subband, data that needs to be sent.

In one embodiment, there are at least the following implementable manners of determining the uplink transmission precoding matrix corresponding to the subband based on the bit quantity of the transmission precoding matrix indicator field corresponding to the subband and the uplink transmission layer quantity.

A first implementable manner: The transmission precoding matrix indicator field corresponding to the subband is used to indicate an initial index of the uplink transmission precoding matrix corresponding to the subband, and the initial index of the uplink transmission precoding matrix corresponding to the subband is determined based on the bit quantity of the transmission precoding matrix indicator field corresponding to the subband and a value of the transmission precoding matrix indicator field corresponding to the subband; a target index of the uplink transmission precoding matrix corresponding to the subband after adjustment is determined based on the initial index and a correspondence between an initial index and a target index; and the uplink transmission precoding matrix corresponding to the subband is determined based on the target index, the uplink transmission layer quantity, and a codebook.

In this implementable manner, if the transmission precoding matrix indicator field corresponding to the subband is used to indicate the initial index of the uplink transmission precoding matrix corresponding to the subband, the terminal device determines the value of the transmission precoding matrix indicator field corresponding to the subband based on the bit quantity of the transmission precoding matrix indicator field corresponding to the subband, and further determines the initial index (which is equal to the value of the transmission precoding matrix indicator field corresponding to the subband) of the uplink transmission precoding matrix corresponding to the subband. Further, the terminal device determines the target index of the uplink transmission precoding matrix corresponding to the subband after adjustment based on the initial index and the correspondence between an initial index and a target index, where the correspondence between an initial index and a target index may be a preset correspondence, or may be a correspondence configured by the network device by using a higher layer signaling message or a physical layer signaling message. Further, the terminal device determines, in the codebook based on the target index, the uplink transmission layer quantity, and the codebook, a target precoding matrix matching the target index and the transmission layer quantity as the uplink transmission precoding matrix corresponding to the subband. In one embodiment, the codebook is preset in both the terminal device and the network device, or the network device configures the codebook for the terminal device by using the higher layer signaling message or the physical layer signaling message.

In one embodiment, the correspondence between an initial index and a target index satisfies the following formula or a table corresponding to the following formula: $I_{dx}=I_{dx}^{0}*k+\Delta$, where $I_{dx}^{0}$ represents the initial index, k represents an index adjustment coefficient, $\Delta$ represents an index offset coefficient, $I_{dx}$ represents the target index, k is a preset value or a value configured by the network device, and $\Delta$ is a preset value or a value configured by the network device. Certainly, the correspondence between an initial index and a target index may alternatively satisfy another equivalent or variant formula of the formula $I_{dx}=I_{dx}^{0}*k+\Delta$. This is not limited in this embodiment of this application.

In a second implementable manner, the transmission precoding matrix indicator field corresponding to the subband is used to indicate an index of the uplink transmission precoding matrix corresponding to the subband, the uplink transmission precoding matrix corresponding to the index indicated by the transmission precoding matrix indicator field corresponding to the subband is determined in a target codebook, and the target codebook matches the bit quantity of the transmission precoding matrix indicator field corresponding to the subband and the uplink transmission layer quantity.

In this implementable manner, if the transmission precoding matrix indicator field corresponding to the subband is used to indicate the index of the uplink transmission precoding matrix corresponding to the subband, the terminal device determines, in a codebook set, a target codebook matching the bit quantity of the transmission precoding matrix indicator field corresponding to the subband and the uplink transmission layer quantity, where the codebook set includes at least one codebook, and different codebooks correspond to different bit quantities of transmission precoding matrix indicator fields and/or different uplink transmission layer quantities. For example, a codebook corresponds to one uplink transmission layer quantity, the codebook set includes various types of codebooks, and different codebooks correspond to different bit quantities of transmission precoding matrix indicator fields. For another example, a codebook corresponds to one bit quantity of a transmission precoding matrix indicator field, and the codebook set may include one codebook (to be specific, different uplink transmission layer quantities correspond to a same codebook), or a plurality of codebooks (to be specific, different codebooks correspond to different uplink transmission layer quantities, or some different codebooks correspond to different uplink transmission layer quantities). Further, the terminal device determines, in the target codebook, the uplink transmission precoding matrix corresponding to the index indicated by the transmission precoding matrix indicator field corresponding to the subband.

Certainly, there may be another implementable manner in which the terminal device determines the uplink transmission precoding matrix corresponding to the subband based on the bit quantity of the transmission precoding matrix indicator field corresponding to the subband and the uplink transmission layer quantity. This is not limited in this embodiment of this application.

In this embodiment, the network device determines the resource scheduled for uplink of the terminal device (where the resource corresponds to the at least one subband) and the bit quantity of the transmission precoding matrix indicator field corresponding to the at least one subband, and sends the downlink control information that includes the resource allocation information indicator field, the transmission layer quantity indicator field, and the transmission precoding matrix indicator field corresponding to the at least one subband to the terminal device. Further, the terminal device determines the at least one subband scheduled for uplink based on the resource allocation information indicator field, determines the bit quantity of the transmission precoding matrix indicator field corresponding to the subband (where the bit quantity of the transmission precoding matrix indicator field corresponding to the subband is related to the quantity of subbands corresponding to the resource scheduled for uplink), and determines the uplink transmission precoding matrix corresponding to the subband based on the bit quantity of the transmission precoding matrix indicator field corresponding to the subband and the uplink transmission layer quantity. It can be learned that, an uplink transmission precoding matrix is indicated in frequency selective scheduling, and a bit quantity of a transmission precoding matrix indicator field corresponding to a subband is flexibly adjusted based on a quantity of scheduled subbands, so that a transmission precoding matrix indicator field can be effectively used, and control channel resource utilization is improved.

In one embodiment, based on the foregoing embodiment, if the first implementable manner of "determining the uplink transmission precoding matrix corresponding to the subband based on the bit quantity of the transmission precoding matrix indicator field corresponding to the subband and the uplink transmission layer quantity" is used, the uplink transmission precoding matrix corresponding to the subband may belong to the codebook in the foregoing part of this embodiment; or if the second implementable manner of "determining the uplink transmission precoding matrix corresponding to the subband based on the bit quantity of the transmission precoding matrix indicator field corresponding to the subband and the uplink transmission layer quantity" is used, the uplink transmission precoding matrix corresponding to the subband may belong to the target codebook in the foregoing part of this embodiment.

In one embodiment, the uplink transmission precoding matrix corresponding to the subband includes at least one non-zero element, and a modulus value of the non-zero element is different from a modulus value of another non-zero element in the uplink transmission precoding matrix. In other words, the uplink transmission precoding matrix corresponding to the subband is a non-constant modulus precoding matrix.

In one embodiment, a non-zero element whose modulus value is not 1 in the uplink transmission precoding matrix in the codebook or the target codebook is $\alpha_{m,n}e^{-j\varphi_{m,n}}$, where $\alpha_{m,n}$ represents an amplitude coefficient of an element in row m and column n in the uplink transmission precoding matrix, $0<|\alpha_{m,n}|<1$, $\varphi_{m,n}$ represents a phase coefficient of the element in row m and column n in the uplink transmission precoding matrix, $0\leq\varphi_{m,n}\leq2\pi$, m is a positive integer less than or equal to an antenna port quantity, and $r_i$ is a positive integer less than or equal to the uplink transmission layer quantity. In one embodiment, $\alpha_{m,n}$ may alternatively be equal to 0 or 1 (in other words, a zero element or a one element in the codebook may alternatively be represented as $\alpha_{m,n}e^{-j\varphi_{m,n}}$).

For ease of understanding, this embodiment of this application provides an example of a codebook corresponding to two antenna ports. As shown in Table 2, the codebook includes at least one non-constant modulus precoding matrix. An element 0.5 in row 2 and column 1 in a precoding matrix corresponding to a precoding matrix index that is 3 and a transmission layer quantity that is 2 is used as an example, $\alpha_{2,1}=0.25$, and $\varphi_{1,2}=0$.

TABLE 2

Example of a codebook corresponding to two antenna ports provided in this embodiment of this application

| Precoding matrix index | Transmission layer quantity | |
|---|---|---|
| | v = 1 | v = 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | $\frac{1}{2}\begin{bmatrix}1 & 0.5\\0.5 & -1\end{bmatrix}$ |
| 4 | $\frac{1}{\sqrt{2}}\begin{bmatrix}1\\0\end{bmatrix}$ | $\frac{1}{2}\begin{bmatrix}1 & 0.5\\0.5j & -j\end{bmatrix}$ |
| 5 | $\frac{1}{\sqrt{2}}\begin{bmatrix}0\\1\end{bmatrix}$ | $\frac{1}{2}\begin{bmatrix}0.5 & 1\\1 & -0.5\end{bmatrix}$ |

TABLE 2-continued

Example of a codebook corresponding to two antenna ports provided in this embodiment of this application

| Precoding matrix index | Transmission layer quantity | |
|---|---|---|
| | v = 1 | v = 2 |
| 6 | $\frac{1}{\sqrt{2}}\begin{bmatrix} 1 \\ 0.5 \end{bmatrix}$ | $\frac{1}{2}\begin{bmatrix} 0.5 & 1 \\ j & -0.5j \end{bmatrix}$ |
| 7 | $\frac{1}{\sqrt{2}}\begin{bmatrix} 1 \\ -0.5 \end{bmatrix}$ | $\frac{1}{2}\begin{bmatrix} 1 & \sqrt{0.75} \\ \sqrt{0.75} & -1 \end{bmatrix}$ |
| 8 | $\frac{1}{\sqrt{2}}\begin{bmatrix} 1 \\ 0.5j \end{bmatrix}$ | $\frac{1}{2}\begin{bmatrix} 1 & \sqrt{0.75} \\ \sqrt{0.75}\,j & -j \end{bmatrix}$ |
| 9 | $\frac{1}{\sqrt{2}}\begin{bmatrix} 1 \\ -0.5j \end{bmatrix}$ | $\frac{1}{2}\begin{bmatrix} \sqrt{0.75} & 1 \\ 1 & -\sqrt{0.75} \end{bmatrix}$ |
| 10 | $\frac{1}{\sqrt{2}}\begin{bmatrix} 0.5 \\ 1 \end{bmatrix}$ | $\frac{1}{2}\begin{bmatrix} \sqrt{0.75} & 1 \\ 1 & -\sqrt{0.75}\,j \end{bmatrix}$ |
| 11 | $\frac{1}{\sqrt{2}}\begin{bmatrix} -0.5 \\ 1 \end{bmatrix}$ | — |
| 12 | $\frac{1}{\sqrt{2}}\begin{bmatrix} 0.5j \\ 1 \end{bmatrix}$ | — |
| 13 | $\frac{1}{\sqrt{2}}\begin{bmatrix} -0.5j \\ 1 \end{bmatrix}$ | — |
| 14 | $\frac{1}{\sqrt{2}}\begin{bmatrix} 1 \\ \sqrt{0.75} \end{bmatrix}$ | — |
| 15 | $\frac{1}{\sqrt{2}}\begin{bmatrix} 1 \\ -\sqrt{0.75} \end{bmatrix}$ | — |
| 16 | $\frac{1}{\sqrt{2}}\begin{bmatrix} 1 \\ \sqrt{0.75}\,j \end{bmatrix}$ | — |
| 17 | $\frac{1}{\sqrt{2}}\begin{bmatrix} 1 \\ -\sqrt{0.75}\,j \end{bmatrix}$ | — |
| 18 | $\frac{1}{\sqrt{2}}\begin{bmatrix} \sqrt{0.75} \\ 1 \end{bmatrix}$ | — |
| 19 | $\frac{1}{\sqrt{2}}\begin{bmatrix} -\sqrt{0.75} \\ 1 \end{bmatrix}$ | — |
| 20 | $\frac{1}{\sqrt{2}}\begin{bmatrix} \sqrt{0.75}\,j \\ 1 \end{bmatrix}$ | — |
| 21 | $\frac{1}{\sqrt{2}}\begin{bmatrix} -\sqrt{0.75}\,j \\ 1 \end{bmatrix}$ | — |
| 22 to 31 | — | — |

Figure 2B:
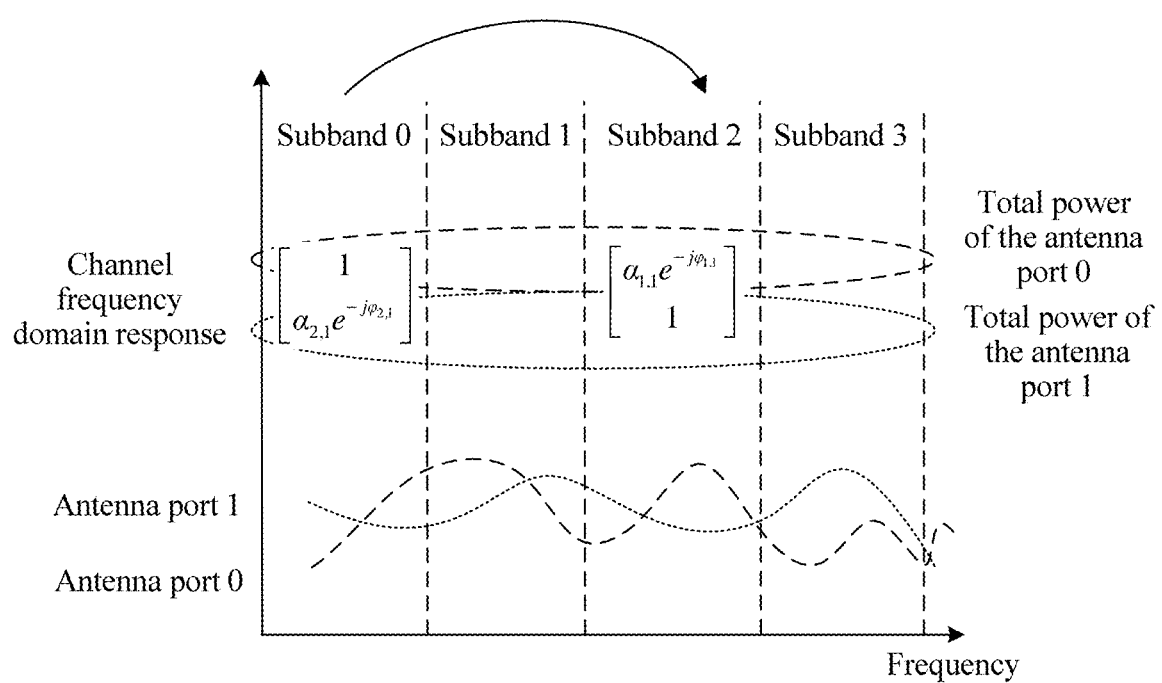
FIG. 2B is a schematic diagram of uplink transmission precoding matrices corresponding to different subbands.

In one embodiment, the uplink transmission layer quantity is equal to 1, the resource allocation information indicator field is used to indicate at least two subbands scheduled for uplink, a sum of squares of modulus values corresponding to all elements in row K of the uplink transmission precoding matrix corresponding to the at least two subbands is equal to a sum of squares of modulus values corresponding to all elements in row L of the uplink transmission precoding matrix corresponding to the at least two subbands, both K and L are positive integers less than or equal to an antenna port quantity, and K is not equal to L. For example, FIG. 2B is a schematic diagram of uplink transmission precoding matrices corresponding to different subbands. As shown in FIG. 2B, when the transmission layer quantity is equal to 1, it is assumed that an uplink transmission precoding matrix corresponding to a subband 0 is $$\frac{1}{\sqrt{2}}\begin{bmatrix} 1 \\ \alpha_{2,1} e^{-j\varphi_{2,1}} \end{bmatrix},$$

and an uplink transmission precoding matrix corresponding to a subband 2 is $$\frac{1}{\sqrt{2}}\begin{bmatrix} \alpha_{1,1} e^{-j\varphi_{1,1}} \\ 1 \end{bmatrix}.$$

A sum $$\frac{1}{2}\left(1 + |\alpha_{1,1} e^{-j\varphi_{1,1}}|^2\right)$$

of squares of modulus values corresponding to all elements in row 1 of the two uplink transmission precoding matrices is equal to a sum $$\frac{1}{2}\left(|\alpha_{2,1} e^{-j\varphi_{2,1}}|^2 + 1\right)$$

of squares of modulus values corresponding to all elements in row 2 of the two uplink transmission precoding matrices. In other words, power sums corresponding to different antenna ports are equal. This ensures uplink coverage.

In one embodiment, the uplink transmission layer quantity is greater than 1, a sum of squares of modulus values corresponding to all elements in row K of the uplink transmission precoding matrix corresponding to the at least one subband is equal to a sum of squares of modulus values corresponding to all elements in row L of the uplink transmission precoding matrix corresponding to the at least one subband, both K and L are positive integers less than or equal to an antenna port quantity, and K is not equal to L. For example, when the transmission layer quantity is equal to 2, the uplink transmission precoding matrix is $$\frac{1}{2}\begin{bmatrix} 1 & \sqrt{0.75} \\ \sqrt{0.75}\,j & -j \end{bmatrix},$$

and a sum $$\frac{1}{4}(1 + 0.75)$$

of squares of modulus values corresponding to all elements in row 1 of the uplink transmission precoding matrix is equal to a sum $$\frac{1}{4}(0.75 + 1)$$

of squares of modulus values corresponding to all elements in row 2 of the uplink transmission precoding matrix, so that it can be ensured that transmit power of all antenna ports is the same, and uplink coverage is ensured.

In one embodiment, based on the foregoing embodiment, the network device may further send coefficient indication information to the terminal device, where the coefficient indication information is used to indicate $\alpha_{m,n}$ and/or $\varphi_{m,n}$ of an element an $\alpha_{m,n}e^{-j\varphi_{m,n}}$ in the uplink transmission precoding matrix in the codebook or the target codebook. In one embodiment, $\alpha_{m,n}$ may alternatively be equal to 0 or 1. In one embodiment, the coefficient indication information includes M-bit first coefficient indication information and/or N-bit second coefficient indication information, where the first coefficient indication information is used to indicate m,n the second coefficient indication information is used to indicate $\varphi_{m,n}$, and both M and N are positive integers greater than 0. For example: the coefficient indication information includes 2-bit first coefficient indication information and 2-bit second coefficient indication information. When the first coefficient indication information corresponds to values 00, 01, 10, and 11, it respectively indicates that $\alpha_{m,n}$ is one of 0, 0.5, $\sqrt{0.75}$, and 1 (for example, 00 indicates 0, 01 indicates 0.5, 10 indicates $\sqrt{0.75}$, and 11 indicates 1). When the second coefficient indication information corresponds to values 00, 01, 10, and 11, it respectively indicates that $\varphi_{m,n}$ is one of 0, $\pi/2$, $\pi$, and $3\pi/2$ (for example, 00 indicates 0, 01 indicates $\pi/2$, 10 indicates $\pi$, and 11 indicates $3\pi/2$).

Correspondingly, the terminal device receives the coefficient indication information sent by the network device, and if the coefficient indication information is used to indicate $\alpha_{m,n}$ and/or $\varphi_{m,n}$ of an element $\alpha_{m,n}e^{-j\varphi_{m,n}}$ in the uplink transmission precoding matrix in the codebook, determines the codebook according to the coefficient indication information; or if the coefficient indication information is used to indicate $\alpha_{m,n}$ and/or $\varphi_{m,n}$ of an element $\alpha_{m,n}e^{-j\varphi_{m,n}}$ in the uplink transmission precoding matrix in the target codebook, determines the target codebook according to the coefficient indication information.

Certainly, the network device may alternatively configure the codebook for the terminal device in another manner. This is not limited in this embodiment of this application. In conclusion, the uplink transmission precoding matrix corresponding to the subband in this embodiment of this application includes at least one non-zero element, and the modulus value of the non-zero element is different from the modulus value of the another non-zero element in the uplink transmission precoding matrix, in other words, the non-constant modulus precoding matrix is used, so that an actual channel can be favorably matched, and precoding performance is improved.

Usually, a single carrier-frequency division multiple access (SC-FDMA) technology is used in LTE, and a requirement for a constant modulus feature of a precoding matrix is relatively strict. Therefore, a codebook used in LTE is a constant modulus codebook. However, an orthogonal frequency division multiple access (OFDM) technology is supported in an uplink in NR, a requirement for a constant modulus feature of a precoding matrix is reduced, and during actual MIMO transmission, an optimal precoding matrix corresponding to a MIMO channel is a non-constant modulus precoding matrix. Therefore, it is difficult for the existing constant modulus codebook in LTE to match an actual channel, resulting in degraded precoding performance. Therefore, Embodiment 2 of the transmission precoding matrix indication method provided in this application is to resolve the technical problem of system performance degradation in the prior art.

The technical solutions of this application and how to resolve the foregoing technical problem by using the technical solutions of this application are described in detail below by using specific embodiments.

Figure 3:
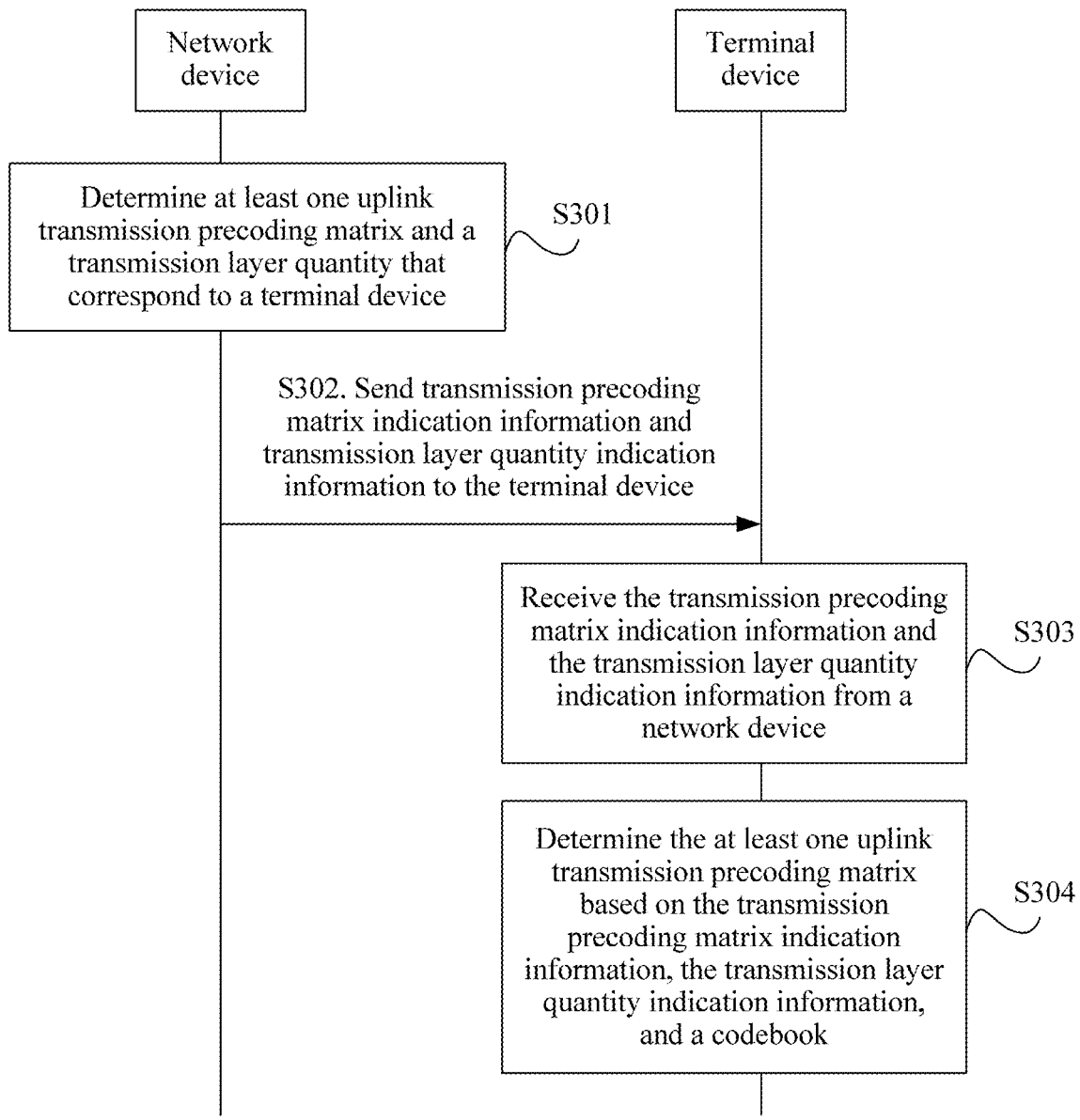
FIG. 3 is a schematic flowchart of Embodiment 2 of a transmission precoding matrix indication method according to this application.

FIG. 3 is a schematic flowchart of Embodiment 2 of a transmission precoding matrix indication method according to this application. Execution bodies in this embodiment include a terminal device and/or a network device. Both the terminal device and the network device may be implemented by using software and/or hardware. As shown in FIG. 3, the method in this embodiment includes the following operations.

Operation S301. Determine at least one uplink transmission precoding matrix and a transmission layer quantity that correspond to the terminal device.

In this operation, the network device determines, in a codebook, the at least one uplink transmission precoding matrix and the transmission layer quantity that correspond to the terminal device based on uplink channel state information corresponding to the terminal device. The uplink transmission precoding matrix includes at least one non-zero element, and a modulus value of the non-zero element is different from a modulus value of another non-zero element in the uplink transmission precoding matrix. In other words, the uplink transmission precoding matrix is a non-constant modulus precoding matrix. Certainly, the network device may alternatively determine the at least one uplink transmission precoding matrix and the transmission layer quantity that correspond to the terminal device based on other information. This is not limited in this embodiment.

In one embodiment, a non-zero element whose modulus value is not 1 in the uplink transmission precoding matrix in the codebook is $\alpha_{m,n}e^{-j\varphi_{m,n}}$, where $\alpha_{m,n}$ represents an amplitude coefficient of an element in row m and column n in the uplink transmission precoding matrix, $0<\alpha_{m,n}<1$, $\varphi_{m,n}$ represents a phase coefficient of the element in row m and column Y in the uplink transmission precoding matrix, $0 \leq \varphi_{m,n} \leq 2\pi$, m is a positive integer less than or equal to an antenna port quantity, and Y is a positive integer less than or equal to the transmission layer quantity. In one embodiment, $\alpha_{m,n}$ may alternatively be equal to 0 or 1 (in other words, a zero element or a one element in the codebook may alternatively be represented as $\alpha_{m,n}e^{-j\varphi_{m,n}}$).

For ease of understanding, this embodiment of this application provides an example of a codebook corresponding to two antenna ports. As shown in Table 2, the codebook includes at least one non-constant modulus precoding matrix. An element 0.5 in row 2 and column 1 in a precoding matrix corresponding to a precoding matrix index that is 3 and a transmission layer quantity that is 2 is used as an example, $\alpha_{2,1}=0.25$, and $\varphi_{1,2}=0$. In one embodiment, the transmission layer quantity is equal to 1, and the network device determines, in the codebook, at least two uplink transmission precoding matrices corresponding to the terminal device, where different uplink transmission precoding matrices correspond to different subbands, a sum of squares of modulus values corresponding to all elements in row K of the at least two uplink transmission precoding matrices is equal to a sum of squares of modulus values corresponding to all elements in row L of the at least two uplink transmission precoding matrices, both K and L are positive integers less than or equal to an antenna port quantity, and K is not equal to L. For example, as shown in FIG. 2B, when the transmission layer quantity is equal to 1, it is assumed that an uplink transmission precoding matrix corresponding to a subband 0 is $$\frac{1}{\sqrt{2}}\begin{bmatrix} 1 \\ \alpha_{2,1}e^{-j\varphi_{2,1}} \end{bmatrix},$$

and an uplink transmission precoding matrix corresponding to a subband 2 is $$\frac{1}{\sqrt{2}}\begin{bmatrix} \alpha_{1,1}e^{-j\varphi_{1,1}} \\ 1 \end{bmatrix}.$$

A sum $$\frac{1}{2}\left(1 + |\alpha_{1,1}e^{-j\varphi_{1,1}}|^2\right)$$

of squares of modulus values corresponding to all elements in row 1 of the two uplink transmission precoding matrices is equal to a sum $$\frac{1}{2}\left(|\alpha_{2,1}e^{-j\varphi_{2,1}}|^2 + 1\right)$$

of squares of modulus values corresponding to all elements in row 2 of the two uplink transmission precoding matrices. In other words, power sums corresponding to different antenna ports are equal.

In one embodiment, the transmission layer quantity is greater than 1, a sum of squares of modulus values corresponding to all elements in row K of the at least one uplink transmission precoding matrix is equal to a sum of squares of modulus values corresponding to all elements in row L of the at least one uplink transmission precoding matrix, both K and L are positive integers less than or equal to an antenna port quantity, and K is not equal to L. For example, when the transmission layer quantity is equal to 2, the uplink transmission precoding matrix is $$\frac{1}{2}\begin{bmatrix} 1 & \sqrt{0.75} \\ \sqrt{0.75}\,j & -j \end{bmatrix},$$

and a sum $$\frac{1}{4}(1 + 0.75)$$

of squares of modulus values corresponding to all elements in row 1 of the uplink transmission precoding matrix is equal to a sum $$\frac{1}{4}(0.75 + 1)$$

of squares of modulus values corresponding to all elements in row 2 of the uplink transmission precoding matrix.

operation S302. Send transmission precoding matrix indication information and transmission layer quantity indication information to the terminal device.

In this operation, the network device sends the transmission precoding matrix indication information and the transmission layer quantity indication information to the terminal device. The transmission precoding matrix indication information is used to indicate the at least one of uplink transmission precoding matrices included in the codebook (for example, the transmission precoding matrix indication information is used to indicate an index of the at least one uplink transmission precoding matrix). The transmission layer quantity indication information is used to indicate the transmission layer quantity. In one embodiment, when joint encoding is performed, the transmission precoding matrix indication information and the transmission layer quantity indication information are located in a field in downlink control information; or when non-joint encoding is performed, the transmission precoding matrix indication information may be located in a transmission precoding matrix indicator field in the downlink control information, and the transmission layer quantity indication information may be located in a transmission layer quantity indicator field in the downlink control information. Certainly, the transmission precoding matrix indication information and the transmission layer quantity indication information may alternatively be transmitted in another carrying manner. This is not limited in this embodiment.

Operation S303. Receive the transmission precoding matrix indication information and the transmission layer quantity indication information from the network device.

In this operation, the terminal device receives the transmission precoding matrix indication information and the transmission layer quantity indication information from the network device. The transmission precoding matrix indication information is used to indicate the at least one of the uplink transmission precoding matrices included in the codebook. The transmission layer quantity indication information is used to indicate the transmission layer quantity.

In one embodiment, the transmission layer quantity is equal to 1, and the transmission precoding matrix indication information is used to indicate at least two of the uplink transmission precoding matrices included in the codebook.

Operation S304. Determine the at least one uplink transmission precoding matrix based on the transmission precoding matrix indication information, the transmission layer quantity indication information, and the codebook.

In this operation, the terminal device determines, in the codebook, the at least one uplink transmission precoding matrix matching an index of the at least one uplink transmission precoding matrix and the transmission layer quantity based on the transmission precoding matrix indication information (for example, the transmission precoding matrix indication information is used to indicate the index of the at least one uplink transmission precoding matrix), the transmission layer quantity, and the codebook, to further preprocess, based on the at least one uplink transmission precoding matrix, data that needs to be sent. The uplink transmission precoding matrix includes at least one non-zero element, and a modulus value of the non-zero element is different from a modulus value of another non-zero element in the uplink transmission precoding matrix. In other words, the codebook is a non-constant modulus codebook, and includes at least one non-constant modulus precoding matrix.

In one embodiment, the codebook is preset in both the terminal device and the network device, or the network device configures the codebook for the terminal device by using a higher layer signaling message or a physical layer signaling message.

In one embodiment, the transmission layer quantity is equal to 1, and the transmission precoding matrix indication information is used to indicate at least two of the uplink transmission precoding matrices included in the codebook (for example, the transmission precoding matrix indication information is used to indicate indexes of the at least two uplink transmission precoding matrices). Different uplink transmission precoding matrices correspond to different subbands. Correspondingly, the terminal device determines the at least two uplink transmission precoding matrices based on the indexes of the at least two uplink transmission precoding matrices, the transmission layer quantity, and the codebook. A sum of squares of modulus values corresponding to all elements in row K of the at least two uplink transmission precoding matrices is equal to a sum of squares of modulus values corresponding to all elements in row L of the at least two uplink transmission precoding matrices. Both K and L are positive integers less than or equal to an antenna port quantity, and K is not equal to L.

In one embodiment, the transmission layer quantity is greater than 1, the terminal device determines the at least one uplink transmission precoding matrix based on an index of the at least one uplink transmission precoding matrix, the transmission layer quantity, and the codebook. A sum of squares of modulus values corresponding to all elements in row K of the at least one uplink transmission precoding matrix is equal to a sum of squares of modulus values corresponding to all elements in row L of the at least one uplink transmission precoding matrix. Both K and L are positive integers less than or equal to an antenna port quantity, and K is not equal to L.

In one embodiment, a non-zero element whose modulus value is not 1 in the uplink transmission precoding matrix in the codebook is $\alpha_{m,n}e^{-j\varphi_{m,n}}$, where $\alpha_{m,n}$ represents an amplitude coefficient of an element in row m and column Y in the uplink transmission precoding matrix, $0<\alpha_{m,n}<1$, $\varphi_{m,n}$ represents a phase coefficient of the element in row m and column Y in the uplink transmission precoding matrix, $0\leq\varphi_{m,n}\leq2\pi$, m is a positive integer less than or equal to an antenna port quantity, and Y is a positive integer less than or equal to the transmission layer quantity.

In this embodiment, the network device determines the at least one uplink transmission precoding matrix and the transmission layer quantity that correspond to the terminal device, and sends the transmission precoding matrix indication information (which is used to indicate the at least one of the uplink transmission precoding matrices included in the codebook) and the transmission layer quantity indication information (which is used to indicate the transmission layer quantity) to the terminal device. Further, the terminal device determines the at least one uplink transmission precoding matrix based on the transmission precoding matrix indication information, the transmission layer quantity indication information, and the codebook, where the uplink transmission precoding matrix includes the at least one non-zero element, and the modulus value of the non-zero element is different from the modulus value of the another non-zero element in the uplink transmission precoding matrix. It can be learned that, the uplink transmission precoding matrix is indicated. In addition, because a non-constant modulus precoding matrix is used, an actual channel can be favorably matched, so that precoding performance is improved.

In one embodiment, based on the foregoing embodiment, the network device may further send coefficient indication information to the terminal device, where the coefficient indication information is used to indicate $\alpha_{m,n}$ and/or $\varphi_{m,n}$ of an element $\alpha_{m,n}e^{-j\varphi_{m,n}}$ in the uplink transmission precoding matrix in the codebook. In one embodiment, $\alpha_{m,n}$ may alternatively be equal to 0 or 1. In one embodiment, the coefficient indication information includes M-bit first coefficient indication information and/or N-bit second coefficient indication information, where the first coefficient indication information is used to indicate $\alpha_{m,n}$, the second coefficient indication information is used to indicate $\varphi_{m,n}$, and both M and N are positive integers greater than 0. For example: the coefficient indication information includes 2-bit first coefficient indication information and 2-bit second coefficient indication information. When the first coefficient indication information corresponds to values 00, 01, 10, and 11, it respectively indicates that $\alpha_{m,n}$ is one of 0, 0.5, $\sqrt{0.75}$, and 1 (for example, 00 indicates 0, 01 indicates 0.5, 10 indicates 0.75, and 11 indicates 1). When the second coefficient indication information corresponds to values 00, 01, 10, and 11, it respectively indicates that $\varphi_{m,n}$ is one of 0, $\pi/2$, $\pi$, and $3\pi/2$ (for example, 00 indicates 0, 01 indicates $\pi/2$, 10 indicates $\pi$, and 11 indicates $3\pi/2$).

Correspondingly, the terminal device receives the coefficient indication information from the network device, to determine the codebook according to the coefficient indication information.

Certainly, the network device may alternatively configure the codebook for the terminal device in another manner. This is not limited in this embodiment of this application.

Usually, to improve edge coverage or accuracy of uplink precoding, and better match an uplink channel, a quantity of uplink transmission precoding matrices needs to be increased, to provide more uplink beams to ensure more accurate uplink direction alignment. However, due to the increase in the quantity of uplink transmission precoding matrices, overheads of the transmission precoding matrix indicator field are relatively high. Therefore, Embodiment 3 and Embodiment 4 of the transmission precoding matrix indication methods provided in this application are to resolve the technical problem of relatively high overheads of the transmission precoding matrix indicator field in the prior art. The following several specific embodiments may be combined with each other, and a same or similar concept or process may not be described repeatedly in some embodiments.

The technical solutions of this application and how to resolve the foregoing technical problem by using the technical solutions of this application are described in detail below by using specific embodiments.

Figure 4:
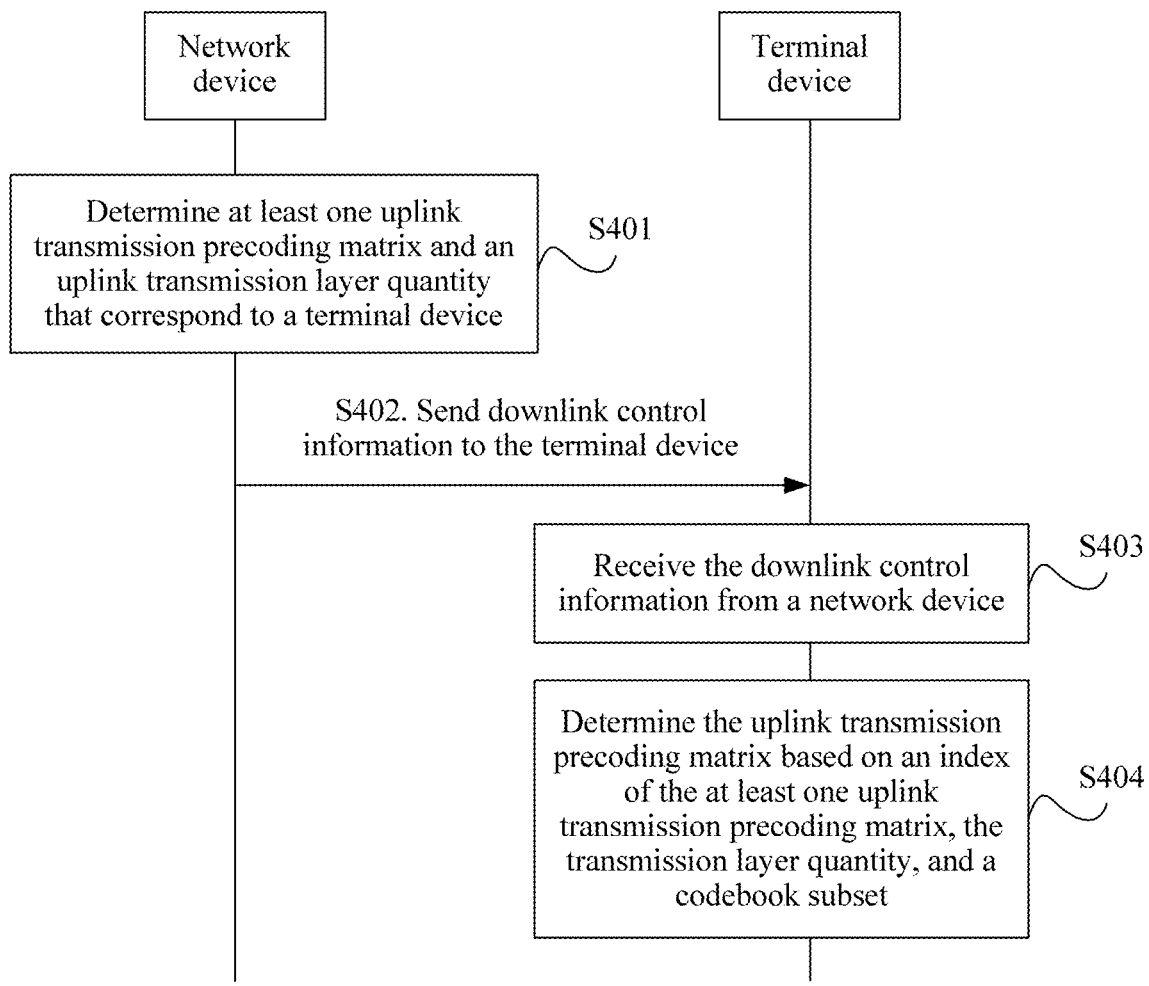
FIG. 4 is a schematic flowchart of Embodiment 3 of a transmission precoding matrix indication method according to this application.

FIG. 4 is a schematic flowchart of Embodiment 3 of a transmission precoding matrix indication method according to this application. Execution bodies in this embodiment include a terminal device and/or a network device. Both the terminal device and the network device may be implemented by using software and/or hardware. As shown in FIG. 4, the method in this embodiment includes the following operations.

Operation S401. Determine at least one uplink transmission precoding matrix and an uplink transmission layer quantity that correspond to the terminal device.

In this operation, the network device determines the at least one uplink transmission precoding matrix and the uplink transmission layer quantity that correspond to the terminal device based on uplink channel state information corresponding to the terminal device. In one embodiment, the at least one uplink transmission precoding matrix is a precoding matrix in a codebook subset, where the codebook subset is a part of a codebook corresponding to the uplink transmission layer quantity. In one embodiment, the codebook is a preset or configured precoding matrix set (namely, a complete codebook) in a current transmission mode.

Certainly, the network device may alternatively determine the at least one uplink transmission precoding matrix and the uplink transmission layer quantity that correspond to the terminal device based on other information. This is not limited in this embodiment.

In one embodiment, indexes of uplink transmission precoding matrices in the codebook subset are indexes successively re-established in a sequential order of the uplink transmission precoding matrices in the codebook. For example, the codebook subset includes indexes 0, 1, 2, ..., N−2, and N−1, and N is a quantity of precoding matrices included in the codebook subset. For another example, the codebook subset includes indexes M, M+1, M+2, ..., M+N−2, and M+N−1. N is a quantity of precoding matrices included in the codebook subset, and M is a preset value. For example, an index that is of a precoding matrix 0 and that is in the codebook is 0, an index that is of a precoding matrix 1 and that is in the codebook is 1, an index that is of a precoding matrix 2 and that is in the codebook is 2, and an index that is of a precoding matrix 3 and that is in the codebook is 3. It is assumed that the precoding matrix 1 and the precoding matrix 3 belong to the codebook subset, and the precoding matrix 0 and the precoding matrix 2 do not belong to the codebook subset. In this case, an index that is of the precoding matrix 1 and that is in the codebook subset is 0, and an index that is of the precoding matrix 3 and that is in the codebook subset is 1.

Operation S402. Send downlink control information to the terminal device.

In this operation, the network device sends the downlink control information to the terminal device. The downlink control information includes a transmission precoding matrix indicator field and a transmission layer quantity indicator field. The transmission precoding matrix indicator field is used to indicate an index of the at least one uplink transmission precoding matrix. The transmission layer quantity indicator field is used to indicate the uplink transmission layer quantity. A bit quantity of the transmission precoding matrix indicator field is related to a quantity of precoding matrices included in the codebook subset. In one embodiment, the bit quantity of the transmission precoding matrix indicator field is determined by the network device based on the quantity of precoding matrices included in the codebook subset, to ensure that the transmission precoding matrix indicator field can indicate any precoding matrix in the codebook subset. For example, it is assumed that the codebook includes 16 precoding matrices and the codebook subset includes eight precoding matrices. In this case, a bit quantity that is used to indicate a transmission precoding matrix indicator field of the codebook is 4, but a bit quantity that is used to indicate a transmission precoding matrix indicator field of the codebook subset is 3. For another example, it is assumed that the codebook includes eight precoding matrices and the codebook subset includes four precoding matrices. In this case, a bit quantity that is used to indicate a transmission precoding matrix indicator field of the codebook is 3, but a bit quantity that is used to indicate a transmission precoding matrix indicator field of the codebook subset is 2.

It can be learned that, the bit quantity of the transmission precoding matrix indicator field is less than the bit quantity that is used to indicate the transmission precoding matrix indicator field of the codebook, so that overheads of the transmission precoding matrix indicator field are reduced. Certainly, the downlink control information may alternatively include another indicator field. This is not limited in this embodiment.

It should be noted that, when joint encoding is performed, the transmission layer quantity indicator field and the transmission precoding matrix indicator field may be combined into one field in the downlink control information. This is not limited in this embodiment of this application.

Operation S403. Receive the downlink control information from the network device.

In this operation, the terminal device receives the downlink control information from the network device. The downlink control information includes the transmission precoding matrix indicator field and the transmission layer quantity indicator field. The transmission precoding matrix indicator field is used to indicate the index of the at least one uplink transmission precoding matrix. The transmission layer quantity indicator field is used to indicate the uplink transmission layer quantity.

Operation S404. Determine the uplink transmission precoding matrix based on the index of the at least one uplink transmission precoding matrix, the uplink transmission layer quantity, and the codebook subset.

In this operation, the terminal device determines, in the codebook subset, the at least one uplink transmission precoding matrix matching the index of the at least one uplink transmission precoding matrix and the transmission layer quantity based on the index of the at least one uplink transmission precoding matrix, the transmission layer quantity, and the codebook subset, to further preprocess, based on the at least one uplink transmission precoding matrix, data that needs to be sent.

In this embodiment, the network device determines the at least one uplink transmission precoding matrix and the uplink transmission layer quantity that correspond to the terminal device, and sends the downlink control information to the terminal device, where the downlink control information includes the transmission precoding matrix indicator field and the transmission layer quantity indicator field, the transmission precoding matrix indicator field is used to indicate the index of the at least one uplink transmission precoding matrix, the transmission layer quantity indicator field is used to indicate the uplink transmission layer quantity, the bit quantity of the transmission precoding matrix indicator field is related to the quantity of precoding matrices included in the codebook subset, and the codebook subset is a part of the codebook corresponding to the uplink transmission layer quantity. Further, the terminal device determines the uplink transmission precoding matrix based on the index of the at least one uplink transmission precoding matrix, the transmission layer quantity, and the codebook subset. It can be learned that, the uplink transmission precoding matrix is indicated. In addition, because the codebook subset is a part of the codebook corresponding to the uplink transmission layer quantity, the bit quantity of the transmission precoding matrix indicator field is less than a bit quantity that is used to indicate a transmission precoding matrix indicator field of the codebook, so that overheads of the transmission precoding matrix indicator field are reduced.

Figure 5:
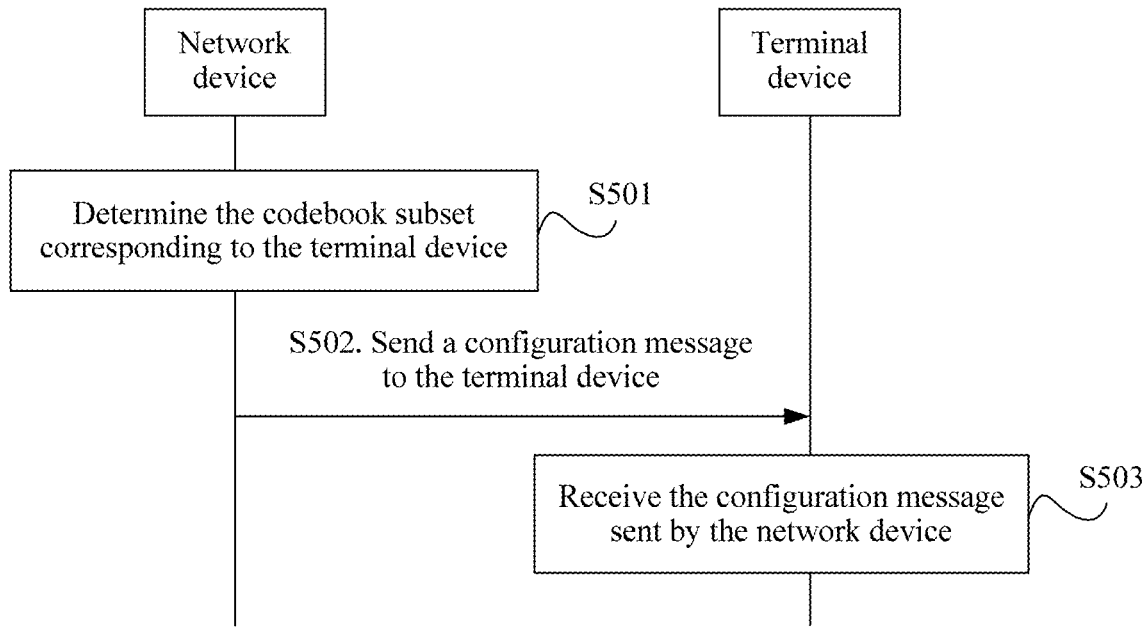
FIG. 5 is a schematic flowchart of Embodiment 4 of a transmission precoding matrix indication method according to this application.

FIG. 5 is a schematic flowchart of Embodiment 4 of a transmission precoding matrix indication method according to this application. As shown in FIG. 5, based on Embodiment 3, the method in this embodiment includes the following operations.

Operation S501. Determine the codebook subset corresponding to the terminal device.

In this operation, the network device determines the codebook subset corresponding to the terminal device. The codebook subset is a part of the codebook corresponding to the uplink transmission layer quantity. In one embodiment, the codebook is a preset or configured precoding matrix set (namely, a complete codebook) in a current transmission mode.

In one embodiment, the network device determines, based on an uplink signal sent by the terminal device or a channel, a codebook subset that needs to be configured. The uplink signal may be a reference signal used for uplink channel sounding, for example, an uplink sounding reference signal (SRS), a reference signal for uplink demodulation, for example, an uplink demodulation reference signal (DMRS), or the like. The channel may be a physical channel used for random access, for example, a physical random access channel (PRACH), a channel used for uplink data transmission, for example, a physical uplink shared channel (PUSCH), or a channel used for uplink control information transmission, for example, a physical uplink control channel (PUCCH), or the like. This is not limited in this embodiment of this application. How to specifically determine, based on an uplink signal sent by the terminal device or a channel, a codebook subset that needs to be configured is not limited in this embodiment of this application. For example, a codebook subset or an uplink transmission precoding matrix set (where the uplink transmission precoding matrix set includes at least one precoding matrix) that may be used may be estimated based on the uplink signal or the channel. Signal quality obtained through measurement by the network device when the terminal device performs uplink sending by using a precoding matrix in the uplink transmission precoding matrix set is higher than signal quality obtained when the terminal device performs uplink sending by using another precoding matrix (which is not a precoding matrix in the uplink transmission precoding matrix set). In one embodiment, the signal quality includes a signal to interference plus noise ratio (SINR). Certainly, the signal quality may further include other information. This is not limited in this embodiment of this application.

Operation S502. Send a configuration message to the terminal device.

In this operation, the network device sends, to the terminal device, a configuration message that is used to indicate the codebook subset, so that the terminal device determines the codebook subset based on the configuration message. In one embodiment, the configuration message may be a higher layer signaling message, or may be a physical layer signaling message. This is not limited in this embodiment of this application.

In one embodiment, the configuration message includes at least one bit. The bit is used to indicate whether at least one transmission precoding matrix corresponding to the bit in the codebook belongs to the codebook subset. If a value of the bit is equal to a preset value (for example, 1), the at least one transmission precoding matrix corresponding to the bit in the codebook belongs to the codebook subset; or if the value of the bit is not equal to the preset value (for example, the value of the bit is equal to 0), the at least one transmission precoding matrix corresponding to the bit in the codebook does not belong to the codebook subset. For example, it is assumed that the configuration message includes 3 bits, the first bit is used to indicate transmission precoding matrices (or precoding matrices) corresponding to indexes 0 to 3 in the codebook, the second bit is used to indicate transmission precoding matrices corresponding to indexes 4 to 7 in the codebook, and the third bit is used to indicate transmission precoding matrices corresponding to indexes 8 to 11 in the codebook. When a value of the first bit is equal to the preset value, it indicates that the transmission precoding matrices corresponding to the indexes 0 to 3 in the codebook belong to the codebook subset; or when a value of the second bit is not equal to the preset value, it indicates that the transmission precoding matrices corresponding to the indexes 4 to 7 in the codebook do not belong to the codebook subset.

In one embodiment, the configuration message includes a sampling factor l and an offset $\Lambda$. In one embodiment, a formula $(I_{dx}^* - \Lambda) \mod l = 0$ is preset in both the network device and the terminal device, where $I_{dx}^*$ represents an index of a transmission precoding matrix in the codebook, and mod represents a REM operation. After determining the sampling factor l and the offset $\Lambda$, the network device and/or the terminal device may learn that a transmission precoding matrix whose index $I_{dx}^*$ satisfies the formula $(I_{dx}^* - \Lambda) \mod l = 0$ in the codebook belongs to the codebook subset.

In one embodiment, the configuration message includes information that is used to indicate at least one target element constituting the codebook subset (for example, it is assumed that an element in the codebook is $\alpha_{m,n} e^{-j\varphi_{m,n}}$, $0 \leq \alpha_{m,n} \leq 1$, and $0 \leq \varphi_{m,n} \leq 2\pi$, the target element is an element in a precoding matrix constituting the codebook subset, and the information about the target element may be $\alpha_{m,n}$ and/or $\varphi_{m,n}$), so that the terminal device determines that a precoding matrix including only the target element in the codebook belongs to the codebook subset, in other words, any precoding matrix including an element other than the target element in the codebook does not belong to the codebook subset.

In one embodiment, the configuration message may be further used to indicate an index of at least one target precoding matrix that is used to constitute the codebook subset and that is in the codebook, so that the terminal device determines the codebook subset based on the configuration message.

Certainly, the configuration message may alternatively be used to indicate the codebook subset in another form. This is not limited in this embodiment of this application.

Operation S503. Receive the configuration message sent by the network device.

In this operation, the terminal device receives the configuration message sent by the network device, to determine the codebook subset based on the configuration message. In one embodiment, if the configuration message includes the at least one bit, the terminal device determines, based on a value of the at least one bit, whether the at least one transmission precoding matrix corresponding to the bit in the codebook belongs to the codebook subset. When the value of the bit is equal to a preset value (for example, 1), the terminal device determines that the at least one transmission precoding matrix corresponding to the bit in the codebook belongs to the codebook subset. In one embodiment, if the configuration message includes a sampling factor 1 and an offset Λ, the terminal device determines, based on the sampling factor 1 and the offset Λ, that a transmission precoding matrix whose index $I_{dx}*$ satisfies a formula $(I_{dx}*-Λ)$ mod 1=0 in the codebook belongs to the codebook subset. In one embodiment, if the configuration message includes information that is used to indicate at least one target element constituting the codebook subset, the terminal device determines, based on the configuration message, that a precoding matrix including only the target element in the codebook belongs to the codebook subset. Certainly, the configuration message may alternatively include another form. Correspondingly, the terminal device may alternatively determine the codebook subset in another form. In this embodiment, details are not described herein again.

In this embodiment, the network device determines the codebook subset (where the codebook subset is a part of the codebook corresponding to the uplink transmission layer quantity) corresponding to the terminal device, and sends, to the terminal device, the configuration message that is used to indicate the codebook subset. Further, the terminal device receives the configuration message sent by the network device, to determine the codebook subset based on the configuration message. It can be learned that, an indication manner for the codebook subset is implemented, so that the terminal device determines the uplink transmission precoding matrix based on the codebook subset.

Figure 6:
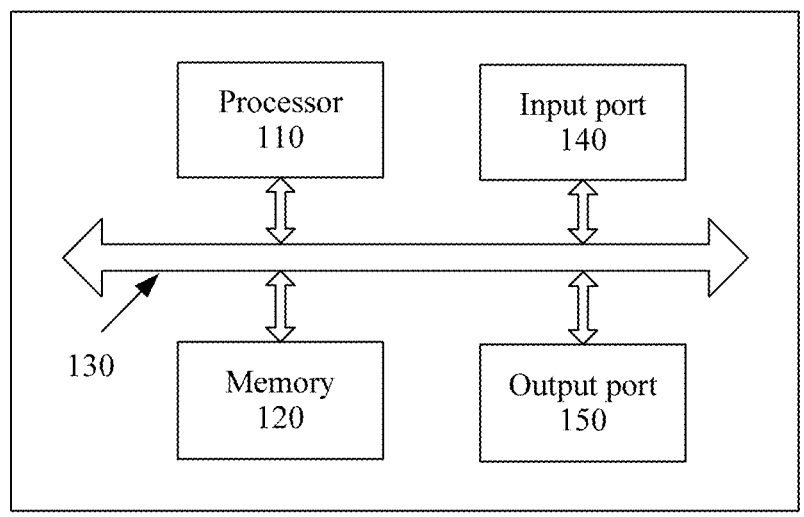
FIG. 6 is a first schematic diagram of a device according to an embodiment of this application.

According to the foregoing method, FIG. 6 is a first schematic diagram of a device according to an embodiment of this application. As shown in FIG. 6, the device may be a terminal device 10, or may be a chip or a circuit, such as a chip or a circuit that can be disposed in a terminal device. The terminal device 10 may correspond to the terminal device in the foregoing method.

The device may include a processor 110 and a memory 120. The memory 120 is configured to store an instruction. The processor 110 is configured to execute the instruction stored in the memory 120, to implement the operations in the method corresponding to any one of FIG. 2A, and FIG. 3 to FIG. 5.

Further, the device may include an input port 140 and an output port 150. Further, the device may include a bus system 130, where the processor 110, the memory 120, the input port 140, and the output port 150 may be interconnected by using the bus system 130.

The processor 110 is configured to execute the instruction stored in the memory 120, to control the input port 140 to receive a signal and control the output port 150 to send a signal, to complete the operations of the terminal device in the foregoing method. The input port 140 and the output port 150 may be a same physical entity or different physical entities. When being a same physical entity, the input port 140 and the output port 150 may be collectively referred to as an input/output port. The memory 120 may be integrated into the processor 110, or the memory 120 and the processor 110 may be separately disposed.

In an implementation, it may be considered that functions of the input port 140 and the output port 150 are implemented by using a transceiver circuit or a chip dedicated for sending and receiving. It may be considered that the processor 110 is implemented by using a dedicated processing chip, a dedicated processing circuit, a dedicated processor, or a universal chip.

In another implementation, it may be considered that the terminal device provided in this embodiment of this application is implemented in a form of a general-purpose computer. To be specific, program code for implementing functions of the processor 110, the input port 140, and the output port 150 is stored in the memory, and the general-purpose processor implements the functions of the processor 110, the input port 140, and the output port 150 by executing the code in the memory.

For concepts, explanations, detailed descriptions, and other operations related to the technical solutions provided in this embodiment of this application and related to the device, refer to related descriptions in the foregoing method or another embodiment. Details are not described herein again.

Figure 7:
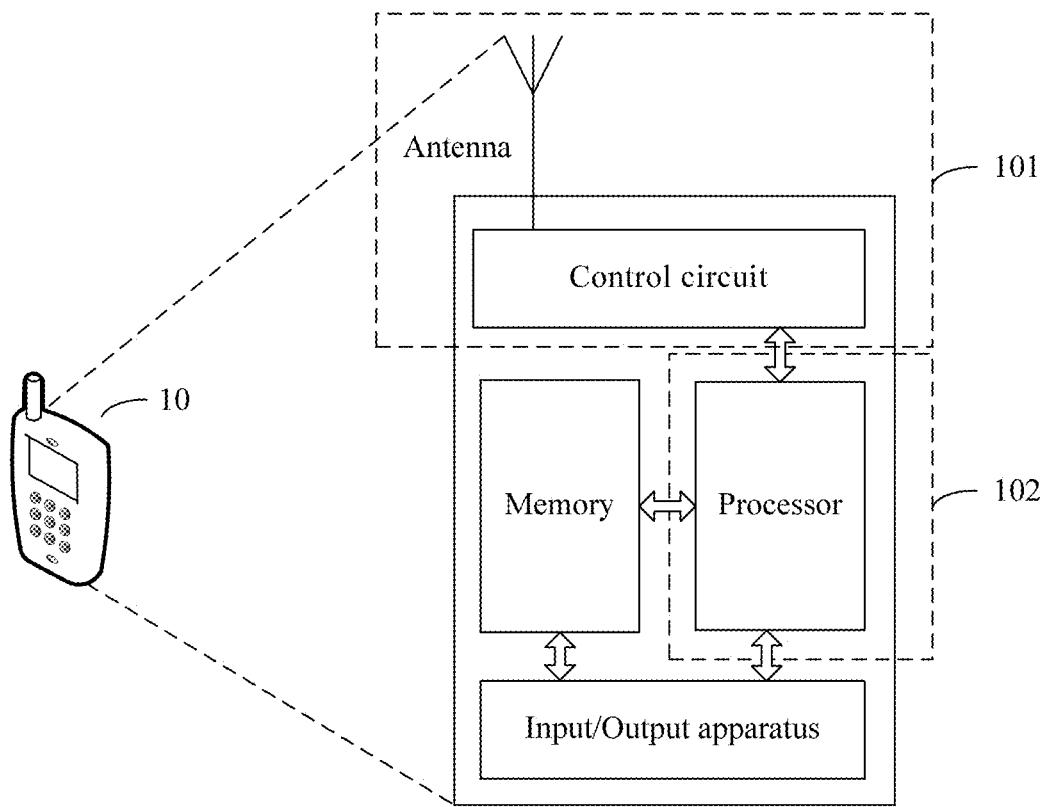
FIG. 7 is a schematic structural diagram of a terminal device according to this application.

FIG. 7 is a schematic structural diagram of a terminal device according to this application. The terminal device is applicable to the system shown in FIG. 1. For ease of description, FIG. 7 shows only main components of the terminal device. As shown in FIG. 7, the terminal device 10 includes a processor, a memory, a control circuit, an antenna, and an input/output apparatus. The processor is mainly configured to process a communication protocol and communication data, and control the entire terminal device, execute a software program, and process data of the software program. For example, the processor is configured to support the terminal device in performing an action described in the embodiment of the transmission precoding matrix indication method. The memory is mainly configured to store the software program and the data, for example, store the codebook described in the foregoing embodiment. The control circuit is mainly configured to convert a baseband signal and a radio frequency signal, and process the radio frequency signal. The control circuit and the antenna together may be referred to as an input/output port, and are mainly configured to receive and send radio frequency signals in a form of an electromagnetic wave. The input/output apparatus, for example, a touchscreen, a display screen, or a keyboard, is mainly configured to receive data entered by a user and output data to the user.

After the terminal device is powered on, the processor may read the software program in a storage unit, interpret and execute an instruction of the software program, and process the data of the software program. When the data needs to be sent wirelessly, the processor performs baseband processing on the to-be-sent data, and outputs a baseband signal to a radio frequency circuit. The radio frequency circuit performs radio frequency processing on the baseband signal, and then sends the radio frequency signal through the antenna in a form of an electromagnetic wave. When data is sent to the terminal device, the radio frequency circuit receives the radio frequency signal through the antenna, converts the radio frequency signal into a baseband signal, and outputs the baseband signal to the processor. The processor converts the baseband signal into data and processes the data.

A person skilled in the art may understand that, for ease of description, FIG. 7 shows only one memory and one processor. In an example terminal device, there may be a plurality of processors and a plurality of memories. The memory may also be referred to as a storage medium, a storage device, or the like. This is not limited in this embodiment of this application.

In one embodiment, the processor may include a baseband processor and a central processing unit. The baseband processor is mainly configured to process the communication protocol and the communication data. The central processing unit is mainly configured to control the entire terminal device, execute the software program, and process the data of the software program. The functions of the baseband processor and the central processing unit are integrated into the processor in FIG. 7. A person skilled in the art may understand that, the baseband processor and the central processing unit may alternatively be processors independent of each other, and interconnected by using a technology, such as a bus. A person skilled in the art may understand that, the terminal device may include a plurality of baseband processors to adapt to different network standards, the terminal device may include a plurality of central processing units to enhance a processing capability of the terminal device, and the components of the terminal device may be connected by using various buses. The baseband processor may alternatively be expressed as a baseband processing circuit or a baseband processing chip. The central processing unit may alternatively be expressed as a central processing circuit or a central processing chip. The function of processing the communication protocol and the communication data may be built in the processor, or may be stored in the storage unit in a form of a software program, and the processor executes the software program to implement a baseband processing function.

For example, in this embodiment of this application, the antenna having receiving and sending functions and the control circuit may be considered as a transceiver unit 101 of the terminal device 10, and the processor having a processing function may be considered as a processing unit 102 of the terminal device 10. As shown in FIG. 7, the terminal device 10 includes the transceiver unit 101 and the processing unit 102. The transceiver unit may alternatively be referred to as an input/output port, a transceiver, a transceiver apparatus, or the like. In one embodiment, a device configured to implement a receiving function in the transceiver unit 101 may be considered as a receiving unit, and a device configured to implement a sending function in the transceiver unit 101 is considered as a sending unit. To be specific, the transceiver unit 101 includes the receiving unit and the sending unit. For example, the receiving unit may alternatively be referred to as a receiver, an input port, a receiver circuit, or the like, and the sending unit may alternatively be referred to as a transmitter, a transmitting machine, a transmitter circuit, or the like.

Figure 8:
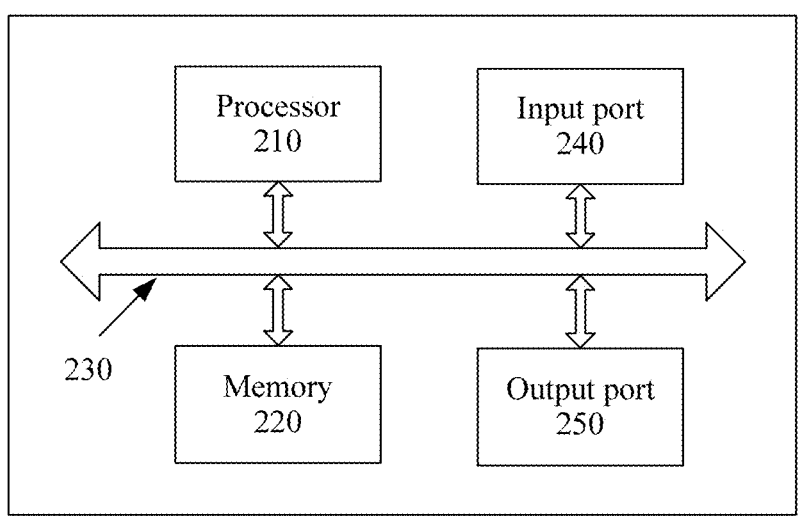
FIG. 8 is a second schematic diagram of a device according to an embodiment of this application.

According to the foregoing method, FIG. 8 is a second schematic diagram of a device according to an embodiment of this application. As shown in FIG. 8, the device may be a network device 20, or may be a chip or a circuit, such as a chip or a circuit that can be disposed in a network device. The device 20 corresponds to the network device in the foregoing method. The device may include a processor 210 and a memory 220. The memory 220 is configured to store an instruction. The processor 210 is configured to execute the instruction stored in the memory 220, so that the device implements the method corresponding to any one of FIG. 2A, and FIG. 3 to FIG. 5.

Further, the device may include an input port 240 and an output port 250. Still further, the network may include a bus system 230.

The processor 210, the memory 220, the input port 240, and the output port 250 are interconnected by using the bus system 230. The processor 210 is configured to execute the instruction stored in the memory 220, to control the input port 240 to receive a signal and control the output port 250 to send a signal, to complete the operations of the network device in the foregoing method. The input port 240 and the output port 250 may be a same physical entity or different physical entities. When being a same physical entity, the input port 240 and the output port 250 may be collectively referred to as an input/output port. The memory 220 may be integrated into the processor 210, or the memory 220 and the processor 210 may be separately disposed.

In one embodiment, it may be considered that functions of the input port 240 and the output port 250 are implemented by using a transceiver circuit or a chip dedicated for sending and receiving. It may be considered that the processor 210 is implemented by using a dedicated processing chip, a dedicated processing circuit, a dedicated processor, or a universal chip.

In one embodiment, it may be considered that the network device provided in this embodiment of this application is implemented in a form of a general-purpose computer. To be specific, program code for implementing functions of the processor 210, the input port 240, and the output port 250 is stored in the memory, and the general-purpose processor implements the functions of the processor 210, the input port 240, and the output port 250 by executing the code in the memory.

For concepts, explanations, detailed descriptions, and other operations related to the technical solutions provided in this embodiment of this application and related to the device, refer to related descriptions in the foregoing method or another embodiment. Details are not described herein again.

Figure 9:
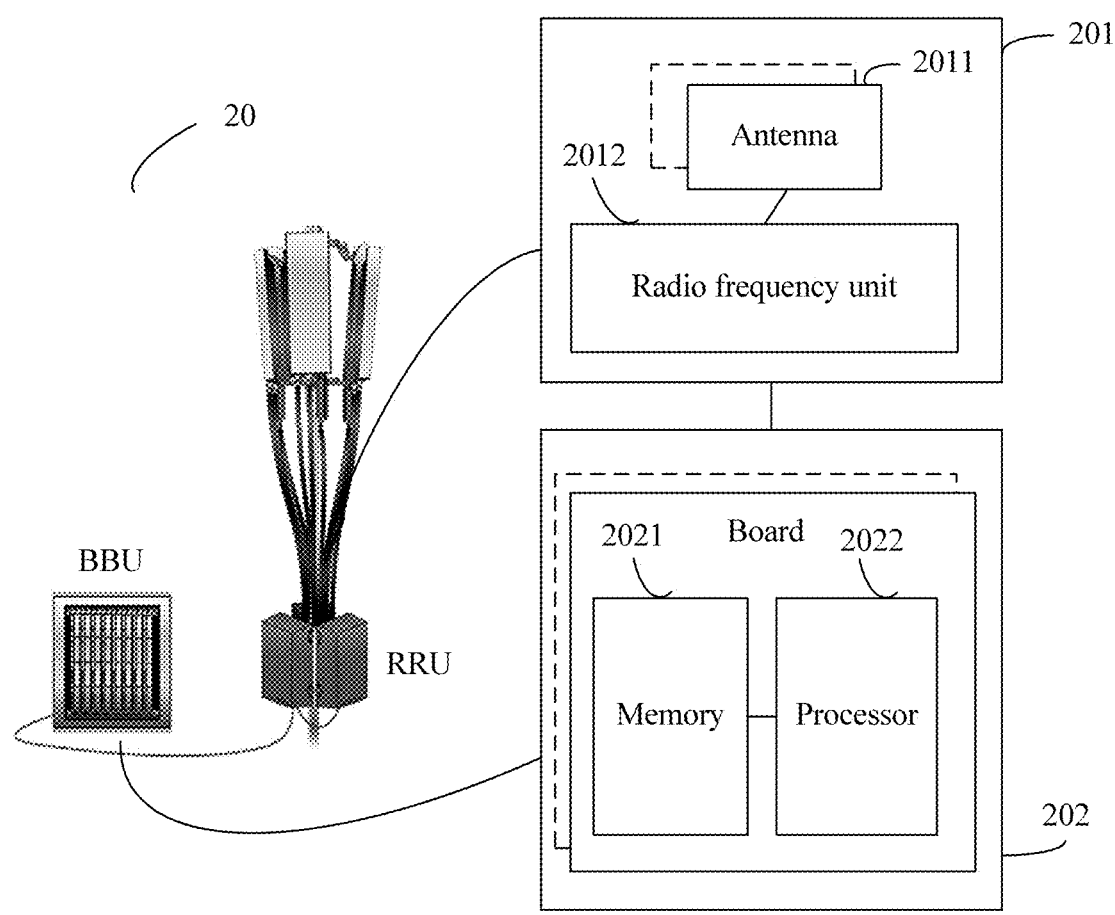
FIG. 9 is a schematic structural diagram of a network device according to an embodiment of this application.

According to the foregoing method, FIG. 9 is a schematic structural diagram of a network device according to an embodiment of this application, and for example, may be a schematic structural diagram of a base station. As shown in FIG. 9, the base station may be applied to the system shown in FIG. 1. The base station 20 includes one or more radio frequency units, for example, one or more remote radio units (RRU) 201, and one or more baseband units (BBU) (which may also be referred to as digital units, digital unit, DU) 202. The RRU 201 may be referred to as a transceiver unit, a transceiver, a transceiver circuit, an input/output port, or the like, and may include at least one antenna 2011 and a radio frequency unit 2012. The RRU 201 is mainly configured to receive and send radio frequency signals and perform conversion between a radio frequency signal and a baseband signal, for example, is configured to send the signaling message in the foregoing embodiment to a terminal device. The BBU 202 is mainly configured to perform baseband processing, control the base station, and the like. The RRU 201 and the BBU 202 may be physically disposed together, or may be physically disposed separately, in other words, may be distributed base stations.

The BBU 202 is a control center of the base station, or may be referred to as a processing unit, and is mainly configured to complete a baseband processing function, such as channel encoding, multiplexing, modulation, or a spread spectrum. For example, the BBU (processing unit) may be configured to control the base station to perform an operation procedure related to the network device in the foregoing method embodiment.

In an example, the BBU 202 may include one or more boards. A plurality of boards may jointly support a radio access network (for example, an LTE network) of a single access standard, or may separately support radio access networks of different access standards. The BBU 202 further includes a memory 2021 and a processor 2022. The memory 2021 is configured to store a necessary instruction and necessary data. For example, the memory 2021 stores the preset information, the codebook, or the like in the foregoing embodiment. The processor 2022 is configured to control the base station to perform a necessary action, for example, is configured to control the base station to perform an operation procedure related to the network device in the foregoing method embodiment. The memory 2021 and the processor 2022 may serve one or more boards. In other words, a memory and a processor may be separately disposed on each board. Alternatively, a plurality of boards share a same memory and a same processor. In addition, a necessary circuit may be disposed on each board.

According to the method provided in the embodiments of this application, an embodiment of this application further provides a communications system, including the network device and one or more terminal devices described above.

It should be understood that in the embodiments of this application, the processor may be a central processing unit (CPU), or the processor may be another general-purpose processor, a digital signal processor (DSP), an application-specific integrated circuit (ASIC), a field programmable gate array (FPGA), another programmable logic device, a discrete gate, a transistor logic device, a discrete hardware component, or the like. The general-purpose processor may be a microprocessor, or the processor may be any conventional processor or the like.

The memory may include a read-only memory and a random access memory, and provide an instruction and data to the processor. A part of the memory may further include a non-volatile random access memory.

In addition to a data bus, the bus system may include a power bus, a control bus, a status signal bus, and the like. However, for clear description, various types of buses in the figure are marked as the bus system.

In an implementation process, operations in the foregoing methods may be implemented by using a hardware integrated logic circuit in the processor, or by using instructions in a form of software. The operations of the methods disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor. To avoid repetition, details are not described herein again.

It should be further understood that, first, second, third, fourth, and various reference numerals in this specification are merely distinguished for ease of description, and are not intended to limit the scope of the embodiments of this application.

It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in various embodiments of this application. The execution sequences of the processes should be determined based on functions and internal logic of the processes, and should not constitute any limitation on the implementation processes of the embodiments of this application.

A person of ordinary skill in the art may be aware that, in combination with illustrative logical blocks and operations described in the embodiments disclosed in this specification, the embodiments can be implemented by electronic hardware or a combination of computer software and electronic hardware. Whether these functions are performed by using hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a specific working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logic function division and may be other division in an some embodiments. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center wired (for example, by using a coaxial cable, an optical fiber, or a digital subscriber line (DSL)) or wirelessly (for example, through infrared, radio, and microwave). The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A transmission precoding matrix indication method, comprising:
    receiving downlink control information from a network device, wherein the downlink control information comprises a resource allocation information indicator field, a transmission layer quantity indicator field, and a transmission precoding matrix indicator field corresponding to at least one subband, the resource allocation information indicator field is used to indicate a resource scheduled for uplink, the resource corresponds to the at least one subband, the transmission layer quantity indicator field is used to indicate an uplink transmission layer quantity, and the transmission precoding matrix indicator field corresponding to the at least one subband is used to indicate an uplink transmission precoding matrix corresponding to the at least one subband;
    determining a bit quantity of the transmission precoding matrix indicator field corresponding to the at least one subband, wherein the bit quantity of the transmission precoding matrix indicator field corresponding to the at least one subband is not greater than a preset total bit quantity of the transmission precoding matrix indicator field, a sum of bit quantities of all transmission precoding matrix indicator fields corresponding to all subbands is not greater than the preset total bit quantity, and the bit quantity of the transmission precoding matrix indicator field corresponding to the at least one subband is related to a quantity of subbands corresponding to the resource scheduled for uplink; and
    determining the uplink transmission precoding matrix corresponding to the at least one subband based on the bit quantity of the transmission precoding matrix indicator field corresponding to the at least one subband and the uplink transmission layer quantity.

2. The method according to claim 1, wherein the bit quantity of the transmission precoding matrix indicator field corresponding to the at least one subband satisfies the following formula:

$N=\min\{\text{floor}(N_A/N_s), N_{max}\}$, wherein

N represents the bit quantity of the transmission precoding matrix indicator field corresponding to the at least one subband, floor ( ) represents a rounding down function, $N_A$ represents the preset total bit quantity of the transmission precoding matrix indicator field, $N_s$ represents a quantity of the at least one subband, $N_{max}$ represents a preset maximum bit quantity of the transmission precoding matrix indicator field, and the quantity of the at least one subband is a positive integer not less than 1.

3. The method according to claim 1, wherein the bit quantity of the transmission precoding matrix indicator field corresponding to the at least one subband is equal to a target preset bit quantity that is of the transmission precoding matrix indicator field, that corresponds to a quantity of the at least one subband, and that is in preset information, the preset information comprises a correspondence between at least one preset subband quantity and a preset bit quantity that is of a transmission precoding matrix indicator field and that corresponds to the preset subband quantity, and the quantity of the at least one subband is a positive integer not less than 1.

4. The method according to claim 1, wherein the transmission precoding matrix indicator field corresponding to the at least one subband is used to indicate an initial index of the uplink transmission precoding matrix corresponding to the at least one subband, and the determining the uplink transmission precoding matrix corresponding to the at least one subband based on the bit quantity of the transmission precoding matrix indicator field corresponding to the at least one subband and the uplink transmission layer quantity comprises:
    determining the initial index of the uplink transmission precoding matrix corresponding to the at least one subband based on the bit quantity of the transmission precoding matrix indicator field corresponding to the at least one subband and a value of the transmission precoding matrix indicator field corresponding to the at least one subband;
    determining a target index of the uplink transmission precoding matrix corresponding to the at least one subband based on the initial index and a correspondence between an initial index and a target index; and
    determining the uplink transmission precoding matrix corresponding to the at least one subband based on the target index, the uplink transmission layer quantity, and a codebook.

5. The method according to claim 4, wherein the correspondence between an initial index and a target index satisfies the following formula or a table corresponding to the following formula:

$I_{dx}=I_{dx}^0 *k+\Delta$, wherein $I_{dx}^0$ represents the initial index, k represents an index adjustment coefficient, $\Delta$ represents an index offset coefficient, $I_{dx}$ represents the target index, k is a preset value or a value configured by the network device, and $\Delta$ is a preset value or a value configured by the network device.

6. The method according to claim 1, wherein the transmission precoding matrix indicator field corresponding to the at least one subband is used to indicate an index of the uplink transmission precoding matrix corresponding to the at least one subband, and the determining the uplink transmission precoding matrix corresponding to the at least one subband based on the bit quantity of the transmission precoding matrix indicator field corresponding to the at least one subband and the uplink transmission layer quantity comprises:
    determining, in a target codebook, the uplink transmission precoding matrix corresponding to the index indicated by the transmission precoding matrix indicator field corresponding to the at least one subband, wherein the target codebook matches the bit quantity of the transmission precoding matrix indicator field corresponding to the at least one subband and the uplink transmission layer quantity.

7. A transmission precoding matrix indication method, comprising:
    determining a resource scheduled for uplink of a terminal device and a bit quantity of a transmission precoding matrix indicator field corresponding to at least one subband, wherein the resource corresponds to at least one subband, the bit quantity of the transmission precoding matrix indicator field corresponding to the at least one subband is not greater than a preset total bit quantity of the transmission precoding matrix indicator field, a sum of bit quantities of all transmission precoding matrix indicator fields corresponding to all subbands is not greater than the preset total bit quantity, and the bit quantity of the transmission precoding matrix indicator field corresponding to the at least one subband is related to a quantity of subbands corresponding to the resource scheduled for uplink; and sending downlink control information to a terminal device, wherein the downlink control information comprises a resource allocation information indicator field, a transmission layer quantity indicator field, and the transmission precoding matrix indicator field corresponding to the at least one subband, the resource allocation information indicator field is used to indicate the resource scheduled for uplink, the transmission layer quantity indicator field is used to indicate an uplink transmission layer quantity, and the transmission precoding matrix indicator field corresponding to the at least one subband is used to indicate an uplink transmission precoding matrix corresponding to the at least one subband.

8. The method according to claim 7, wherein the bit quantity of the transmission precoding matrix indicator field corresponding to the at least one subband satisfies the following formula:

$$N = \min\{\text{floor}(N_A/N_s), N_{max}\}, \text{ wherein}$$

N represents the bit quantity of the transmission precoding matrix indicator field corresponding to the at least one subband, floor ( ) represents a rounding down function, $N_A$ represents the preset total bit quantity of the transmission precoding matrix indicator field, $N_s$ represents a quantity of the at least one subband, $N_{max}$ represents a preset maximum bit quantity of the transmission precoding matrix indicator field, and the quantity of the at least one subband is a positive integer not less than 1.

9. The method according to claim 7, wherein the bit quantity of the transmission precoding matrix indicator field corresponding to the at least one subband is equal to a target preset bit quantity that is of the transmission precoding matrix indicator field, that corresponds to a quantity of the at least one subband, and that is in preset information, the preset information comprises a correspondence between at least one preset subband quantity and a preset bit quantity that is of a transmission precoding matrix indicator field and that corresponds to the preset subband quantity, and the quantity of the at least one subband is a positive integer not less than 1.

10. The method according to claim 7, wherein the transmission precoding matrix indicator field corresponding to the at least one subband is used to indicate an initial index of the uplink transmission precoding matrix corresponding to the at least one subband, and there is a correspondence between the initial index and a target index of a transmission precoding matrix corresponding to the at least one subband.

11. A device, comprising a processor and a memory, wherein
the memory is configured to store an instruction, the processor is configured to execute the instruction stored in the memory to cause the device perform the following:

receiving downlink control information from a network device, wherein the downlink control information comprises a resource allocation information indicator field, a transmission layer quantity indicator field, and a transmission precoding matrix indicator field corresponding to at least one subband, the resource allocation information indicator field is used to indicate a resource scheduled for uplink, the resource corresponds to the at least one subband, the transmission layer quantity indicator field is used to indicate an uplink transmission layer quantity, and the transmission precoding matrix indicator field corresponding to the at least one subband is used to indicate an uplink transmission precoding matrix corresponding to the at least one subband;

determining a bit quantity of the transmission precoding matrix indicator field corresponding to the at least one subband, wherein the bit quantity of the transmission precoding matrix indicator field corresponding to the at least one subband is not greater than a preset total bit quantity of the transmission precoding matrix indicator field, a sum of bit quantities of all transmission precoding matrix indicator fields corresponding to all subbands is not greater than the preset total bit quantity, and the bit quantity of the transmission precoding matrix indicator field corresponding to the at least one subband is related to a quantity of subbands corresponding to the resource scheduled for uplink; and determining the uplink transmission precoding matrix corresponding to the at least one subband based on the bit quantity of the transmission precoding matrix indicator field corresponding to the at least one subband and the uplink transmission layer quantity.

12. The device according to claim 11, wherein the bit quantity of the transmission precoding matrix indicator field corresponding to the at least one subband satisfies the following formula:

$$N = \min\{\text{floor}(N_A/N_s), N_{max}\}, \text{ wherein}$$

N represents the bit quantity of the transmission precoding matrix indicator field corresponding to N the at least one subband, $\text{floor}()$ represents a rounding down function, $N_A$ represents the preset total bit quantity of the transmission precoding matrix indicator field, $N_S$ represents a quantity of the at least one subband, $N_{max}$ represents a preset maximum bit quantity of the transmission precoding matrix indicator field, and the quantity of the at least one subband is a positive integer not less than 1.

13. The device according to claim 11, wherein the bit quantity of the transmission precoding matrix indicator field corresponding to the at least one subband is equal to a target preset bit quantity that is of the transmission precoding matrix indicator field, that corresponds to a quantity of the at least one subband, and that is in preset information, the preset information comprises a correspondence between at least one preset subband quantity and a preset bit quantity that is of a transmission precoding matrix indicator field and that corresponds to the preset subband quantity, and the quantity of the at least one subband is a positive integer not less than 1.

14. The device according to claim 11, wherein the transmission precoding matrix indicator field corresponding to the at least one subband is used to indicate an initial index of the uplink transmission precoding matrix corresponding to the at least one subband, and the instruction for determining the uplink transmission precoding matrix corresponding to the at least one subband based on the bit quantity of the transmission precoding matrix indicator field corresponding to the at least one subband and the uplink transmission layer quantity comprises an instruction for the following:
- determining the initial index of the uplink transmission precoding matrix corresponding to the at least one subband based on the bit quantity of the transmission precoding matrix indicator field corresponding to the at least one subband and a value of the transmission precoding matrix indicator field corresponding to the at least one subband;
- determining a target index of the uplink transmission precoding matrix corresponding to the at least one subband based on the initial index and a correspondence between an initial index and a target index; and
- determining the uplink transmission precoding matrix corresponding to the at least one subband based on the target index, the uplink transmission layer quantity, and a codebook.

15. The device according to claim 14, wherein the correspondence between an initial index and a target index satisfies the following formula or a table corresponding to the following formula:

$I_{dx} = I^0{}_{dx} * k + \Delta$, wherein $I^0{}_{dx}$ represents the initial index, $k$ represents an index adjustment coefficient, $\Delta$ represents an index offset coefficient, $I_{dx}$ represents the target index, $k$ is a preset value or a value configured by the network device, and $\Delta$ is a preset value or a value configured by the network device.

16. The device according to claim 11, wherein the transmission precoding matrix indicator field corresponding to the at least one subband is used to indicate an index of the uplink transmission precoding matrix corresponding to the at least one subband, and the instruction for determining the uplink transmission precoding matrix corresponding to the at least one subband based on the bit quantity of the transmission precoding matrix indicator field corresponding to the at least one subband and the uplink transmission layer quantity comprises an instruction for the following:
- determining, in a target codebook, the uplink transmission precoding matrix corresponding to the index indicated by the transmission precoding matrix indicator field corresponding to the at least one subband, wherein the target codebook matches the bit quantity of the transmission precoding matrix indicator field corresponding to the at least one subband and the uplink transmission layer quantity.

17. The method according to claim 7, wherein the transmission precoding matrix indicator field corresponding to the at least one subband is used to indicate an index of the uplink transmission precoding matrix corresponding to the at least one subband, the index is used to indicate the uplink transmission precoding matrix that corresponds to the index indicated by the transmission precoding matrix indicator field corresponding to the at least one subband and that is in a target codebook, and the target codebook matches the bit quantity of the transmission precoding matrix indicator field corresponding to the at least one subband and the uplink transmission layer quantity.

18. A device, comprising a processor and a memory, wherein the memory is configured to store an instruction, the processor is configured to execute the instruction stored in the memory to cause the device perform the following:
- determining a resource scheduled for uplink of a terminal device and a bit quantity of a transmission precoding matrix indicator field corresponding to at least one subband, wherein the resource corresponds to at least one subband, the bit quantity of the transmission precoding matrix indicator field corresponding to the at least one subband is not greater than a preset total bit quantity of the transmission precoding matrix indicator field, a sum of bit quantities of all transmission precoding matrix indicator fields corresponding to all subbands is not greater than the preset total bit quantity, and the bit quantity of the transmission precoding matrix indicator field corresponding to the at least one subband is related to a quantity of subbands corresponding to the resource scheduled for uplink; and
- sending downlink control information to a terminal device, wherein the downlink control information comprises a resource allocation information indicator field, a transmission layer quantity indicator field, and the transmission precoding matrix indicator field corresponding to the at least one subband, the resource allocation information indicator field is used to indicate the resource scheduled for uplink, the transmission layer quantity indicator field is used to indicate an uplink transmission layer quantity, and the transmission precoding matrix indicator field corresponding to the at least one subband is used to indicate an uplink transmission precoding matrix corresponding to the at least one subband.

19. The device according to claim 18, wherein the bit quantity of the transmission precoding matrix indicator field corresponding to the at least one subband satisfies the following formula:

$N = \min\{\text{floor}(N_\Delta/N_s), N_{max}\}$, wherein $N$ represents the bit quantity of the transmission precoding matrix indicator field corresponding to the at least one subband, $\text{floor}()$ represents a rounding down function, $N_\Delta$ represents the preset total bit quantity of the transmission precoding matrix indicator field, $N_S$ represents a quantity of the at least one subband, $N_{max}$ represents a preset maximum bit quantity of the transmission precoding matrix indicator field, and the quantity of the at least one subband is a positive integer not less than 1.

20. The device according to claim 18, wherein the bit quantity of the transmission precoding matrix indicator field corresponding to the at least one subband is equal to a target preset bit quantity that is of the transmission precoding matrix indicator field, that corresponds to a quantity of the at least one subband, and that is in preset information, the preset information comprises a correspondence between at least one preset subband quantity and a preset bit quantity that is of a transmission precoding matrix indicator field and that corresponds to the preset subband quantity, and the quantity of the at least one subband is a positive integer not less than 1.

21. The device according to claim 18, wherein the transmission precoding matrix indicator field corresponding to the at least one subband is used to indicate an initial index of the uplink transmission precoding matrix corresponding to the at least one subband, and there is a correspondence between the initial index and a target index of a transmission precoding matrix corresponding to the at least one subband.

22. The device according to claim 18, wherein the transmission precoding matrix indicator field corresponding to the at least one subband is used to indicate an index of the uplink transmission precoding matrix corresponding to the at least one subband, the index is used to indicate the uplink transmission precoding matrix that corresponds to the index indicated by the transmission precoding matrix indicator field corresponding to the at least one subband and that is in a target codebook, and the target codebook matches the bit quantity of the transmission precoding matrix indicator field corresponding to the at least one subband and the uplink transmission layer quantity.

* * * * *